(12) United States Patent
Haverkamp et al.

(10) Patent No.: US 11,938,913 B2
(45) Date of Patent: Mar. 26, 2024

(54) POWER BRAKE SYSTEM OF A VEHICLE AND METHOD FOR CONTROLLING SAME

(71) Applicant: ZF CV Systems Global GmbH, Bern (CH)

(72) Inventors: Michael Haverkamp, Hannover (DE); Lars Volker, Seelze (DE)

(73) Assignee: ZF CV Systems Global GmbH, Bern (CH)

( * ) Notice: Subject to any disclaimer, the term of this patent is extended or adjusted under 35 U.S.C. 154(b) by 223 days.

(21) Appl. No.: 17/449,461

(22) Filed: Sep. 30, 2021

(65) Prior Publication Data
US 2022/0105911 A1  Apr. 7, 2022

(30) Foreign Application Priority Data
Oct. 1, 2020  (DE) .................... 10 2020 125 639.6

(51) Int. Cl.
*B60T 8/1755* (2006.01)
*B60T 8/36* (2006.01)
*B60T 13/22* (2006.01)
*B60T 13/68* (2006.01)

(52) U.S. Cl.
CPC .......... *B60T 8/17551* (2013.01); *B60T 8/361* (2013.01); *B60T 13/22* (2013.01); *B60T 13/686* (2013.01)

(58) Field of Classification Search
CPC .......... B60T 8/361; B60T 11/21; B60T 13/16; B60T 13/161; B60T 13/22; B60T 13/686; B60T 8/17551
See application file for complete search history.

(56) References Cited

U.S. PATENT DOCUMENTS

| 4,989,703 | A  | * | 2/1991 | Forsyth | B60W 10/184 192/221 |
| 7,344,199 | B2 | * | 3/2008 | Meyer | B60T 13/16 188/106 P |
| 8,696,070 | B2 | * | 4/2014 | Costaz | B60T 13/168 303/3 |
| 9,061,668 | B2 | * | 6/2015 | Dabbs | B60T 8/17 |

(Continued)

FOREIGN PATENT DOCUMENTS

| DE | 10145789 A1 | 4/2003 |
| DE | 102007042816 A1 | 6/2008 |

(Continued)

*Primary Examiner* — Thomas J Williams
(74) *Attorney, Agent, or Firm* — Dickinson Wright PLLC

(57) ABSTRACT

A power brake system (1.1) of a vehicle (2) has a pressure medium source (14) and a pressure-medium-operated primary brake system (30) operable as a service brake and steering brake system. The primary brake system has at least one foot brake valve (36a, 36b) and two wheel brake cylinders (40a, 40b) arranged on both sides on a drive axle (8) and operable independently of one another. A pressure-medium-operated secondary brake system (50), operable independently of the primary brake system (30), has a brake control valve (56) and at least one brake cylinder (62a, 62b. The secondary brake system (50) is electronically controllable and has a brake control valve (56) configured as a solenoid valve. The braking force of the at least one brake cylinder (62a, 62b) can be set by feeding or removing pressure medium to or from the latter via the brake control valve (56).

19 Claims, 7 Drawing Sheets

(56) References Cited

U.S. PATENT DOCUMENTS

| | | | | |
|---|---|---|---|---|
| 2002/0005661 A1* | 1/2002 | Sherriff | ................ | B60T 13/686 |
| | | | | 303/15 |
| 2003/0011240 A1* | 1/2003 | Dunbar | .................. | B60T 13/16 |
| | | | | 303/5 |
| 2013/0127239 A1* | 5/2013 | Brenninger | ............. | B60T 11/21 |
| | | | | 303/9.61 |
| 2018/0029578 A1* | 2/2018 | Boulivan | .............. | B60T 13/662 |
| 2018/0304874 A1* | 10/2018 | Lucchino | ................ | B60T 13/22 |
| 2020/0047738 A1* | 2/2020 | Zimmerman | ....... | B60W 10/188 |
| 2022/0048488 A1* | 2/2022 | Haverkamp | ............ | B60T 13/68 |
| 2022/0105911 A1* | 4/2022 | Haverkamp | ............ | B60T 13/16 |

FOREIGN PATENT DOCUMENTS

| | | |
|---|---|---|
| DE | 102011113698 A1 | 3/2013 |
| DE | 102017114917 A1 | 1/2019 |

* cited by examiner

POWER BRAKE SYSTEM OF A VEHICLE AND METHOD FOR CONTROLLING SAME

TECHNICAL FIELD

The invention relates to a power brake system of a vehicle, having a pressure medium source, having a pressure-medium-operated primary brake system, which can be used as a service brake and steering brake system, wherein the primary brake system has at least one foot brake valve and two wheel brake cylinders, which are arranged on both sides on a drive axle and can be actuated independently of one another, and having a pressure-medium-operated secondary brake system, which can be actuated independently of the primary brake system and can be used at least as an auxiliary brake system, wherein the secondary brake system has a brake control valve and at least one brake cylinder, which acts on the wheel brakes of a vehicle axle. The invention also relates to a method for controlling such a secondary brake system in various operating modes in accordance with a braking value signal.

BACKGROUND

Commercial vehicles which are intended for use in agriculture, like agricultural tractors and harvesting vehicles, frequently have a pressure-medium-operated primary brake system which can be used both as a service brake system and as a steering brake system. In the function as a service brake system, when a brake pedal is actuated by a driver, all the connected wheel brake cylinders are supplied with pressure medium, as a result of which the relevant wheel brakes are actuated and the vehicle is braked. Since, when driving on fields and meadows, the steering of a vehicle by means of the usual double pivot steering system on the front axle or rear axle is not sufficient to carry out tight turning maneuvers owing to loose ground or a surface that is slippery on account of wetness and vegetation, the primary brake system of many commercial vehicles of this type can also be used as a steering brake system. For this purpose, a corresponding vehicle can be equipped with two brake pedals arranged in parallel, which are mechanically coupled to one another during normal driving and can be decoupled as required when driving on fields and meadows. The two brake pedals are each in actuating connection with one of two separate brake master cylinders, to which wheel brake cylinders arranged on each side at least on the drive axle are connected via a respective brake line. By actuating one of the two brake pedals, the wheel brake of the drive axle is actuated on the relevant vehicle side, thereby assisting the correspondingly turned steering and enabling a tight turning maneuver. In this case, the turning maneuver is assisted by the axle differential of the drive axle in that the reduction in the wheel speed brought about on one side by the braking leads to a corresponding increase in the wheel speed on the other side.

DE 101 45 789 A1 describes several embodiments of a service brake and steering brake system of a vehicle which is equipped with two brake master cylinders which can be actuated via separate brake pedals. In a vehicle which is provided with wheel brakes only on a drivable vehicle axle, in this case the rear axle, when only one brake pedal is actuated, the pressure medium line leading to the wheel brake cylinder of the vehicle wheel located on the other side of the vehicle is shut off by means of an automatically acting compensating valve or a solenoid valve, with the result that only the vehicle wheel of the drive axle which is located on the vehicle side of the actuated brake pedal is braked. In the case of a vehicle which is additionally also provided with wheel brakes on a vehicle axle which is not drivable, in this case the front axle, when only one brake pedal is actuated, the brake lines leading to the wheel brake cylinders of the front axle are additionally shut off by means of an automatically acting sequence valve or at least one further solenoid valve, with the result that the vehicle wheels of the front axle are then not braked.

However, it is also possible for a vehicle equipped with a service brake and steering brake system to be provided with only one brake pedal, where the steering brake function can be activated and deactivated via a switch, the brake lines of the drive-axle wheel brake on the outside of the curve and/or the wheel brakes of the non-driven vehicle axle being switched on and off in accordance with the steering angle of the front wheels or of the steering wheel.

According to a current EU directive, a power brake system of a vehicle intended for use in agriculture and forestry should be redundant. This redundancy can be provided by a service brake system having two brake circuits, of which, for example, the first brake circuit can comprise the wheel brakes of the front axle and the second brake circuit can comprise the wheel brakes of the rear axle. If one of the two brake circuits fails, the vehicle must still be able to be safely braked via the other brake circuit. In this case, at a permissible maximum speed of $v_{max} \geq 30$ km/h at maximum loading, a braking deceleration $a_{Br}$ of at least 2.2 m/s² must be ensured ($a_{Br} \geq 2.2$ m/s²). However, agricultural tractors are frequently provided with wheel brakes only on the drive axle, i.e. on the rear axle. If the non-drivable front axle is also provided with wheel brakes, these are often underdimensioned, meaning that the required braking deceleration of $a_{Br} \geq 2.2$ m/s² cannot be achieved with the wheel brakes of the front axle alone.

In the case where the primary brake system is configured as a service brake and steering brake system with separate brake lines per vehicle side, separation of the brake lines and wheel brake cylinders according to side does not count as a dual-circuit brake system since braking of the vehicle with the wheel brakes of only one vehicle side is not possible without compromising driving stability. In this case, therefore, a secondary brake system which can be operated at least as an auxiliary brake system is required to meet the redundancy requirement, and the secondary brake system should be able to be operated independently of the primary brake system and should satisfy the corresponding requirement for a braking deceleration $a_{Br}$ of at least 2.2 m/s² in the auxiliary braking function.

SUMMARY

It is the underlying object of the present invention, for a vehicle equipped with a power brake system of the type stated at the outset, to present a pressure-medium-operated secondary brake system which can be used in different operating modes and can also be operated as an auxiliary brake system, and with which the homologation regulations in accordance with the abovementioned EU directive are met and a low-cost construction of simple configuration is achieved. Furthermore, the intention is to present a method for controlling a secondary brake system of this kind in various operating modes in accordance with a braking value signal.

These objects have been achieved with a power brake system and a secondary brake system integrated therein and with a method for actuating same which have the features of the independent claims. Advantageous developments are defined in the respective dependent claims.

The invention accordingly relates, in terms of the device, to a power brake system of a vehicle, having a pressure medium source, having a pressure-medium-operated primary brake system, which can be used as a service brake and steering brake system, and having a pressure-medium-operated secondary brake system, which can be actuated independently of the primary brake system and can be used at least as an auxiliary brake system. The primary brake system has at least one foot brake valve and two wheel brake cylinders, which are arranged on both sides on a drive axle and can be actuated independently of one another. The secondary brake system has a brake control valve and at least one brake cylinder acting on the wheel brakes of a vehicle axle.

In order to achieve the device-related object, it is also envisaged in this power brake system that the secondary brake system is electronically controllable and has the following: a brake control valve configured as a solenoid valve for setting the braking force of the at least one brake cylinder by feeding or removing pressure medium to or from the latter; a pressure sensor connected to a working line leading to the at least one brake cylinder; and an electronic brake control unit for evaluating a pressure signal of the pressure sensor and for controlling the brake control valve in accordance with a braking value signal.

By virtue of the aforementioned electronic controllability of the secondary brake system, the latter has good control properties and, with the brake control valve configured as a solenoid valve, the pressure sensor and the electronic brake control unit, is constructed in a comparatively simple and low-cost manner in terms of control technology. If the at least one brake cylinder and the brake to which the brake cylinder is operatively connected are dimensioned appropriately, the homologation regulations in accordance with the abovementioned EU directive can be satisfied without problems.

A first advantageous embodiment envisages that the brake control valve is configured as a 3/3-way proportional valve with a pressure medium inlet, a pressure medium outlet and a working port, wherein the working port is continuously adjustable between connection to the pressure medium outlet and the pressure medium inlet, the pressure medium inlet is connected to a pressure medium source via a supply line, the pressure medium outlet is connected to a pressure medium sink, the working port is connected to the at least one brake cylinder via the working line, and the working port of the brake control valve is connected to the pressure medium outlet in the non-energized state and to the pressure medium inlet in the maximally energized state.

By means of this brake control valve, any desired working pressure between the minimum working pressure given by the ambient pressure and a maximum possible working pressure due to the configuration and the selected control characteristic of the brake control valve can accordingly be set at the working port. Here, the working pressure which can be set by the brake control valve for the brakes assigned to the secondary brake circuit increases with increasing signaled brake demand and increasing energization of the brake control valve, as is expected for brakes which can be actuated by means of piston-cylinder arrangements. This will be discussed in more detail in conjunction with the description of the exemplary embodiments illustrated in FIGS. 1 and 2.

A second advantageous embodiment envisages that the brake control valve is configured as a 3/3-way proportional valve with a pressure medium inlet, a pressure medium outlet and a working port, wherein the working port is continuously adjustable between connection to the pressure medium outlet and the pressure medium inlet, the pressure medium inlet is connected to a pressure medium source via a foot brake valve arranged between two supply pressure lines, the pressure medium outlet is connected to a pressure medium sink, the working port is connected to the at least one brake cylinder via the working line, the pressure medium inlet is connected via an inlet pressure control line to a first control pressure inlet, which acts on a first axial end of the valve spool of the brake control valve, the pressure medium outlet is connected via an outlet pressure control line to a second control pressure inlet, which acts on a second axial end of the valve spool of the brake control valve, a valve spring acts on the first axial end of the brake control valve, an electromagnetic actuator acts on the second axial end of the brake control valve, and, by energizing the actuator, it is possible to set a reduction in the working pressure applied to the pressure medium outlet in comparison with the supply pressure applied to the pressure medium inlet.

By means of this brake control valve just described, any desired working pressure between a maximum possible working pressure due to the configuration and the selected control characteristic of the brake control valve and the minimum working pressure given by the ambient pressure can be set at the working port. Here, the working pressure which can be set by the brake control valve for the brakes assigned to the secondary brake circuit falls with increasing signaled brake demand and increasing energization of the brake control valve, as is required for brakes which can be actuated by means of spring brake cylinders. This will be discussed in more detail in conjunction with the description of the exemplary embodiments illustrated in FIGS. 7 and 8.

According to a first exemplary embodiment, the secondary brake system can have at least two brake cylinders configured as active diaphragm or piston brake cylinders, which are arranged as wheel brake cylinders on both sides on the wheel brakes of a drive axle or of a non-driven vehicle axle. In this embodiment of the brake cylinders, the working pressure acts as brake pressure, by means of which the braking force of the wheel brakes can be controlled directly, that is to say the wheel brakes are released in the case of unpressurized brake cylinders and are applied with maximum braking force when the brake cylinders are acted upon by maximum brake pressure.

As an alternative, however, it is also possible, according to a second exemplary embodiment, for the secondary brake system to have at least two brake cylinders configured as passively acting spring brake cylinders, which are arranged as wheel brake cylinders on both sides on the wheel brakes of a drive axle or of a non-driven vehicle axle. In this embodiment of the brake cylinders, the working pressure acts as a brake release pressure, by means of which the braking force of the wheel brakes can be inversely controlled. In this case, the wheel brakes are applied with maximum braking force in the case of unpressurized brake cylinders and are released when the brake cylinders are acted upon by maximum brake pressure.

Instead of wheel brake cylinders, it is also possible, according to a third exemplary embodiment, for the secondary brake system to have at least one brake cylinder configured as a passively acting spring brake cylinder, which is arranged as an axle brake cylinder on a shaft brake of a central output shaft of the powertrain. The central output shaft may be an output shaft of the vehicle-drive transmission, an input shaft of the axle differential of the drive axle or a cardan shaft arranged between them. Since the wheels of the drive axle are coupled to one another via the axle differential, braking of the central output shaft also leads to braking of the wheels.

In the two last-mentioned embodiments of the secondary brake system, which, because of the passively acting spring brake cylinders, can also be used as parking brake systems, a controllable check valve which blocks in the direction of the brake control valve is arranged in the working line in order to maintain a working pressure in the brake cylinders or in the single brake cylinder. By means of the check valve, a working pressure which is present in the brake cylinders or in the single brake cylinder can be trapped and thus kept constant automatically, that is to say without control-related energy consumption.

The controllable check valve is preferably pressure-controlled and can be unlocked by applying pressure to its control inlet. The check valve is then assigned a pilot valve, by means of which the control inlet of the check valve can be connected alternately to the pressure medium source or to a pressure medium sink.

With regard to the pilot valve, provision is preferably made for it to be configured as a 3/2-way solenoid switching valve with a pressure medium inlet, a pressure medium outlet and a control outlet, for the pressure medium inlet to be connected to the supply line via a connecting line, for the pressure medium outlet to be connected to the pressure medium sink, for the control outlet to be connected to the control inlet of the check valve, for the control outlet of the pilot valve to be connected to the pressure medium outlet in the non-energized state and to the pressure medium inlet in the energized state, and for the electromagnet of the pilot valve to be connected to the brake control unit via an electrical control line.

In order to simplify the installation of the valves in the vehicle and to avoid connection errors, provision is preferably made for at least the brake control valve, the check valve and the pilot valve to be combined in a brake control module.

The brake control unit is preferably assigned a data memory, in which are stored characteristic curves, provided for different operating modes, for setting the working pressure $p_B$, $p_{FSB}$ in the brake cylinders in accordance with a braking value signal $S_{BW}$ and/or for calculating characteristic curves. By storing corresponding characteristic curves in the data memory of the electronic control unit, it is also possible in a simple manner, in addition to operating the secondary brake system in different operating modes, to adapt control to different vehicles, vehicle masses, loading states and different control valves and pressure medium lines.

The secondary brake system can be configured as a hydraulic brake system, the pressure medium source of which comprises an oil pump, a hydraulic pressure preparation device and a hydraulic pressure accumulator, and the pressure medium sink of which is formed by at least one hydraulic collecting tank.

The secondary brake system can likewise be configured as an air brake system, the pressure medium source of which comprises a compressor, a pneumatic pressure preparation device and a pneumatic pressure accumulator, and the pressure medium sink of which is formed by at least one vent outlet.

The invention also relates to a method for controlling a pressure-medium-operated secondary brake system in a power brake system of a vehicle. The power brake system has a primary brake system and a secondary brake system. In respect of the secondary brake system, it is envisaged that said system is electronically controllable and has the following:

a brake control valve configured as a solenoid valve, by means of which the braking force of the at least one brake cylinder can be set by feeding or removing pressure medium to or from the latter, a pressure sensor, which is connected to a working line leading to the at least one brake cylinder, and an electronic brake control unit for evaluating a pressure signal of the pressure sensor and for controlling the brake control valve in accordance with a braking value signal $S_{BW}$.

According to the invention, the method for controlling the secondary brake system provides that the working pressure $p_B$, $p_{FSB}$ in the at least one brake cylinder is set in accordance with the braking value signal $S_{BW}$, with the brake control valve being controlled on the basis of characteristic curves which are valid for different operating modes of the secondary brake system and are stored in a data memory assigned to the brake control unit.

The braking value signal $S_{BW}$ represents the braking demand of the driver, a value of the braking value signal of $S_{BW}=0\%$ indicating the absence of a braking demand and a value of $S_{BW}=100\%$ indicating a maximum braking demand. The braking value signal $S_{BW}$ can be generated in a manner known per se by means of a displacement sensor which is arranged on a foot brake valve of the vehicle and is connected to the brake control unit via an electrical sensor line. As an alternative to this, the braking value signal $S_{BW}$ can also be generated by means of a pressure sensor which is connected to a brake line of a brake circuit of the primary brake system of the vehicle and is connected to the brake control unit via an electrical sensor line.

Thus, in a secondary brake system with actively acting brake cylinders, when using an emergency braking function, in which the service brake system is assisted in braking by the secondary brake system or is replaced by the latter in braking, provision can be made for the working pressure $p_B$, which here acts as a brake pressure, to be increased largely linearly according to a first characteristic curve A, starting from a minimum brake pressure $p_{B\_min}$ close to 0 Pa at a value of the braking value signal of $S_{BW}=0\%$, as the value of the braking value signal increases, up to a maximum brake pressure $P_{B\_max}$ of, for example, $p_{B\_max}=70\times10^5$ Pa at a value of the braking value signal of $S_{BW}=100\%$. The fastest possible increase in the braking effect is achieved by the largely linear profile of the increase in brake pressure and the associated linear increase in the braking force of the brake cylinders.

Provision can furthermore be made, in a secondary brake system with actively acting brake cylinders, in an auxiliary braking function, during the use of which the service brake system is replaced by the secondary brake system in respect of the braking effect on the vehicle, for the working pressure $p_B$ to be increased according to a second characteristic curve B, starting from the minimum brake pressure $p_{B\_min}$ at a value of the braking value signal of $S_{BW}=0\%$, as the value of the braking value signal increases, up to a maximum brake pressure in normal operation $p_{B\_max\_N}$ which is below the maximum brake pressure $p_{B\_max}$ and is, for example, $p_{B\_max\_N}=60\times10^5$ Pa, at a braking value signal $S_{BW}=100\%$.

This brake pressure increase can have, for example, a quadratic or progressive profile. A particularly fast buildup of the braking effect is achieved by a progressive profile of the brake pressure increase and the associated progressive increase in the braking force of the brake cylinders, but the change in the braking effect is matched to the customary behavior of a pressure-controlled primary brake system. The specific characteristic curve-based profile of the brake pressure increase can depend on the vehicle type, the total vehicle weight and/or the specific wishes of the vehicle manufacturer.

In addition, provision can be made, in a secondary brake system with actively acting brake cylinders, in an additional braking function, during the use of which the service brake system is assisted in braking by means of the secondary brake system in the case of higher values of the braking value signal (e.g. $S_{BW} \geq 54\%$), for the working pressure $p_B$ to be increased according to a third characteristic curve C, starting from the minimum brake pressure $p_{B\_min}$ at a value of the braking value signal of $S_{BW}=0\%$, from a defined starting value of the braking value signal $S_{BW\_Start}$ (e.g. $S_{BW\_start}=54\%$), as the value of the braking value signal increases, up to a working pressure $p_B$, at a value of the braking value signal of $S_{BW}=100\%$, which is between the minimum brake pressure $p_{B\_min}$ and the maximum brake pressure in normal operation $p_{B\_max-N}$ (e.g. $p_B=30\times10^5$ Pa).

By means of a quadratic or progressive profile of the brake pressure increase and the associated rapid increase in the braking force of the brake cylinders, which is also advantageous here, the supportive braking effect of the secondary brake system in conjunction with the braking effect of the primary brake system is matched to the customary behavior of a pressure-controlled primary brake system with stronger wheel brakes. The specific profile of the brake pressure increase can depend on the vehicle type, the total vehicle weight and/or the specific wishes of the vehicle manufacturer.

Said three first characteristic curves A, B, C for controlling the secondary brake system in the respective operating mode can be permanently predefined. However, it is also possible for the second and third characteristic curves B, C for the auxiliary braking function and for the additional braking function, respectively, to be generated from the first characteristic curve A for the emergency braking function of the secondary brake system by means of a transfer function with variable reduction of the working pressure $p_B$ with increasing values of the braking value signal $S_{BW}$, wherein the reduction of the working pressure $p_B$ is greater at low values of the braking value signal ($S_{BW} \leq 50\%$) than at high values of the braking value signal ($S_{BW} > 50\%$).

Three further possible characteristic curves A', B', C' for a light vehicle or a vehicle with a low load, in comparison with the three abovementioned characteristic curves A, B, C for a heavy vehicle or a vehicle with a high load, in each case preferably have a profile of the working pressure $p_B$ which is reduced in the direction of the minimum working pressure $p_{B\_min}$, based on increasing values of the braking value signal $S_{BW}$. As a result, excessive braking deceleration of the lighter vehicle and unnecessarily high loading of the wheel brakes of the secondary brake system are avoided.

To determine these fourth, fifth and sixth characteristic curves A', B', C' for a light vehicle or a vehicle with low load, they can be generated from the corresponding three first characteristic curves A, B, C for a heavy vehicle or a vehicle with a high load by means of a reduction in the working pressure $p_B$ which is proportional to the vehicle weight, based on increasing values of the braking value signal $S_{BW}$.

In a secondary brake system with passively acting brake cylinders, when using an emergency braking function, in which the service brake system is assisted in braking by the secondary brake system or is replaced by the latter, provision can be made for the working pressure $p_{FSB}$, which here acts as a brake release pressure, to be reduced largely linearly according to a seventh characteristic curve D, starting from a maximum working pressure $p_{FSB\_max}$ (e.g. $p_{FSB\_max}=70\times10^5$ Pa) at a value of the braking value signal of $S_{BW}=0\%$, as the value of the braking value signal increases, to a minimum working pressure $p_{FSB\_min}$ close to 0 Pa at a value of the braking value signal of $S_{BW}=100\%$. By virtue of the largely linear profile of the working pressure reduction and the associated linear increase in the braking force of the spring brake cylinders, the fastest possible increase in the braking effect is achieved.

When using an auxiliary braking function by means of a secondary brake system with passively acting brake cylinders, in which the service brake system is replaced by the secondary brake system in respect of the braking effect on the vehicle, the working pressure $p_{FSB}$ is reduced according to an eighth characteristic curve E, starting from the maximum working pressure $p_{FSB\_max}$ at a value of the braking value signal of $S_{BW}=0\%$, as the values of the braking value signal increase, to a minimum working pressure in normal operation $p_{FSB\_min-N}$ at a value of the braking value signal of $S_{BW}=100\%$ which is above the minimum working pressure $p_{FSB\_min}$ (e.g. $p_{FSB\_min-N}=12.5\times10^5$ Pa). A fast buildup of the braking effect is likewise achieved by the, for example, quadratic or progressive profile of the working pressure reduction and the associated quadratic or progressive increase in the braking force of the spring brake cylinders, but the change in the braking effect is matched to the customary behavior of a pressure-controlled primary brake system.

Provision can furthermore be made, in a secondary brake system with passively acting brake cylinders, when using an additional braking function, in which the service brake system is assisted in braking by the secondary brake system in the case of higher values of the braking value signal (e.g. $S_{BW} \geq 54\%$), for the working pressure $p_{FSB}$ to be reduced according to a ninth characteristic curve F, starting from the maximum working pressure $p_{FSB\_max}$ at a value of the braking value signal of $S_{BW}=0\%$, from a defined starting value of the braking value signal $S_{BW\_Start}$ (e.g. $S_{BW\_start}=54\%$), as the values of the braking value signal increase, to a working pressure $p_{FSB}$, at a value of the braking value signal of $S_{BW}=100\%$, which is between the maximum working pressure $P_{FSB\_max}$ and the minimum working pressure in normal operation $p_{FSB\_min-N}$ (e.g. $P_{FSB}=47\times10^5$ Pa).

By virtue of a quadratic or progressive profile of the working pressure reduction, which is likewise advantageous here, and the associated rapid increase in the braking force of the spring brake cylinders, the supportive braking effect of the secondary brake system, in conjunction with the braking effect of the primary brake system, is matched to the customary behavior of a pressure-controlled primary brake system with stronger wheel brakes.

In a secondary brake system with passively acting brake cylinders, that is to say with spring brake cylinders, the maximum working pressure $p_{FSB-max}$ is defined by the spring stiffness of the brake springs in the spring brake cylinders since the brakes actuated by these are not completely released until this high working pressure is reached.

If the seventh, eighth or ninth characteristic curves D, E, F for controlling the secondary brake system in the respective operating mode are not permanently predefined, the eighth and ninth characteristic curves E, F for the auxiliary braking function and for the additional braking function, respectively, can be generated from the seventh characteristic curve D for the emergency braking function of the secondary brake system by means of a transfer function with variable increase of the working pressure $P_{FSB}$ over the braking value signal $S_{BW}$ in the direction of the maximum working pressure $P_{FSB\_max}$, wherein the increase of the working pressure $p_{FSB}$ is smaller at low values of the braking value signal (e.g. $S_{BW} \leq 50\%$) than in the case of high braking value signals (e.g. $S_{BW} > 50\%$).

If a secondary brake system of a lighter vehicle is not equipped with weaker spring-loaded brake cylinders in conjunction with a lower level of the working pressure $p_{FSB}$, tenth, eleventh or twelfth characteristic curves D', E', F' for a light vehicle or a vehicle with a low load, in comparison with the corresponding seventh, eighth and ninth characteristic curves D, E, F for a heavy vehicle or a vehicle with a high load, in each case have a profile of the working pressure $p_{FSB}$ which is increased in the direction of the maximum working pressure $p_{FSB\_max}$, based on increasing values of the braking value signal $S_{BW}$. As a result, excessive braking deceleration of the lighter vehicle and unnecessarily high loading of the wheel brakes of the secondary brake system are avoided, while accepting a higher working pressure level overall.

To generate the tenth, eleventh or twelfth characteristic curves D', E', F' for a light vehicle or a vehicle with a low load, these can be generated from the corresponding seventh, eighth and ninth characteristic curves D, E, F for a heavy vehicle or a vehicle with a high load by means of a variable increase in the working pressure $p_{FSB}$ which is proportional to the vehicle weight, based on increasing values of the braking value signal $S_{BW}$ in the direction of the maximum pressure $p_{FSB\_max}$ wherein the increase in the working pressure $p_{FSB}$ is less at low values of the braking value signal (e.g. $S_{BW} \leq 50\%$) than at high values of the braking value signal (for example $S_{BW} > 50\%$).

For further clarification of the invention, four exemplary embodiments are illustrated in the appended drawings.

DETAILED DESCRIPTION OF THE DRAWINGS

Figure 1:
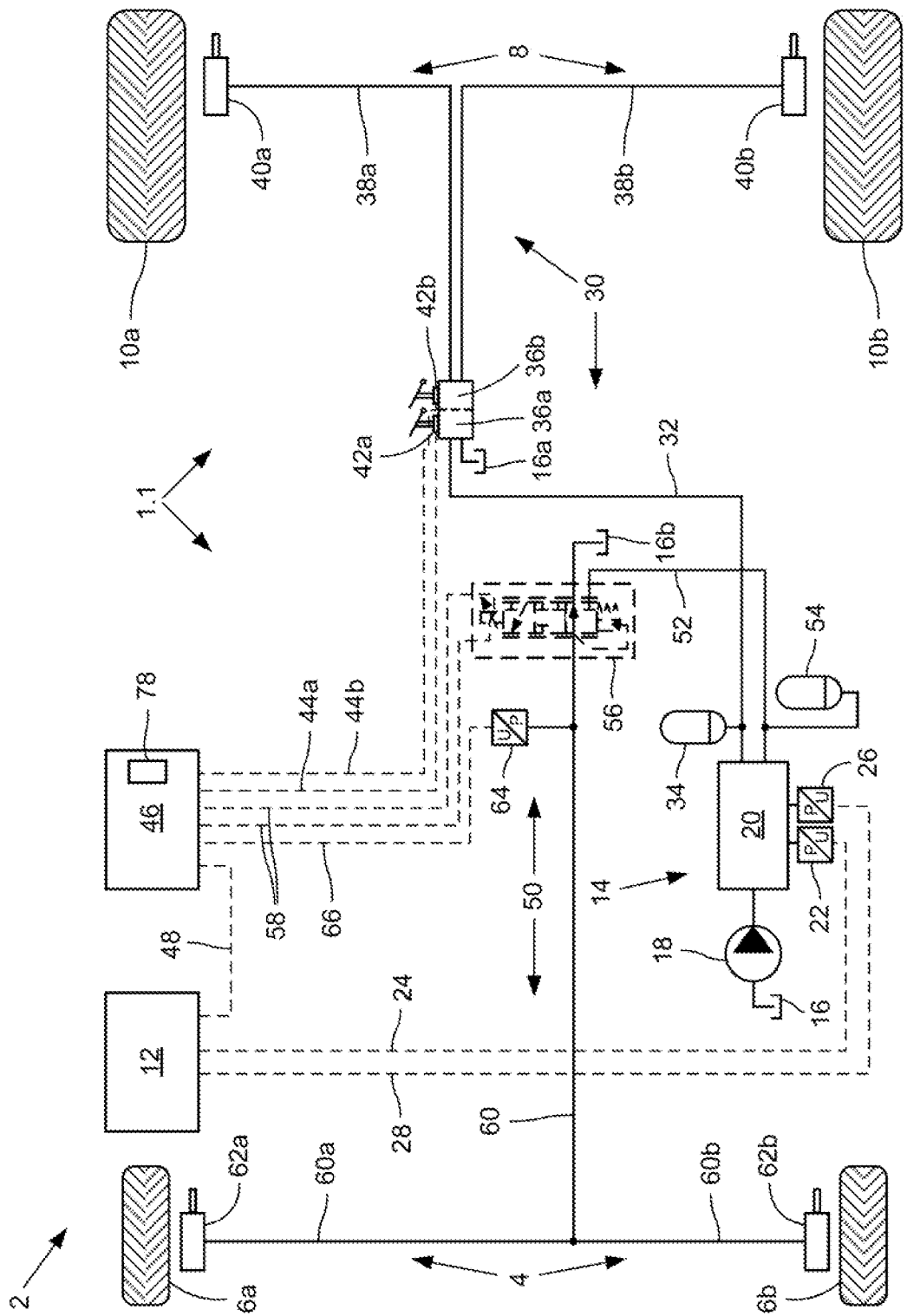
FIG. 1 shows a schematic view of a power brake system of a vehicle having a primary brake system and a first embodiment of a secondary brake system according to the invention.

A total of four embodiments of power brake systems 1.1, 1.2, 1.3, 1.4 having a secondary brake system 50, 50', 68, 100 according to the invention and a method according to the invention for controlling such a secondary brake system 50, 50', 68, 100 are described below by way of example in each case with reference to a vehicle 2 which is intended for use in agriculture and forestry. In the case of the power brake systems 1.1, 1.2, 1.3 according to FIGS. 1 to 3, the working pressure of the secondary brake system 50, 50', 68 can be controlled exclusively electronically. In contrast to this, the power brake system 1.4 according to FIG. 4 has a secondary brake system 100, the working pressure of which can be controlled mechanically and electronically in combination.

Figure 2:
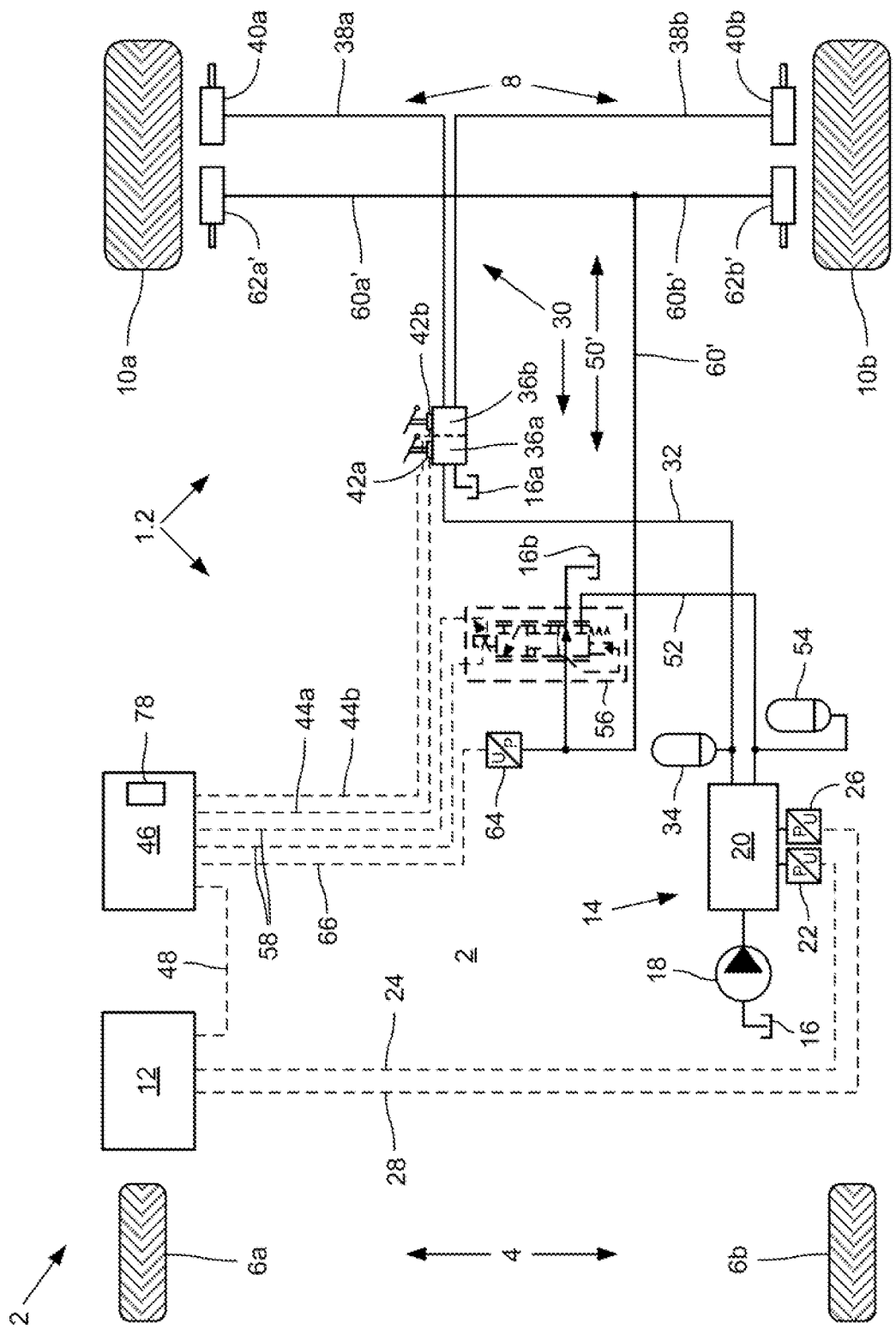
FIG. 2 shows a schematic view of a power brake system of a vehicle with a primary brake system according to FIG. 1 and a second embodiment of a secondary brake system according to the invention.
Figure 3:
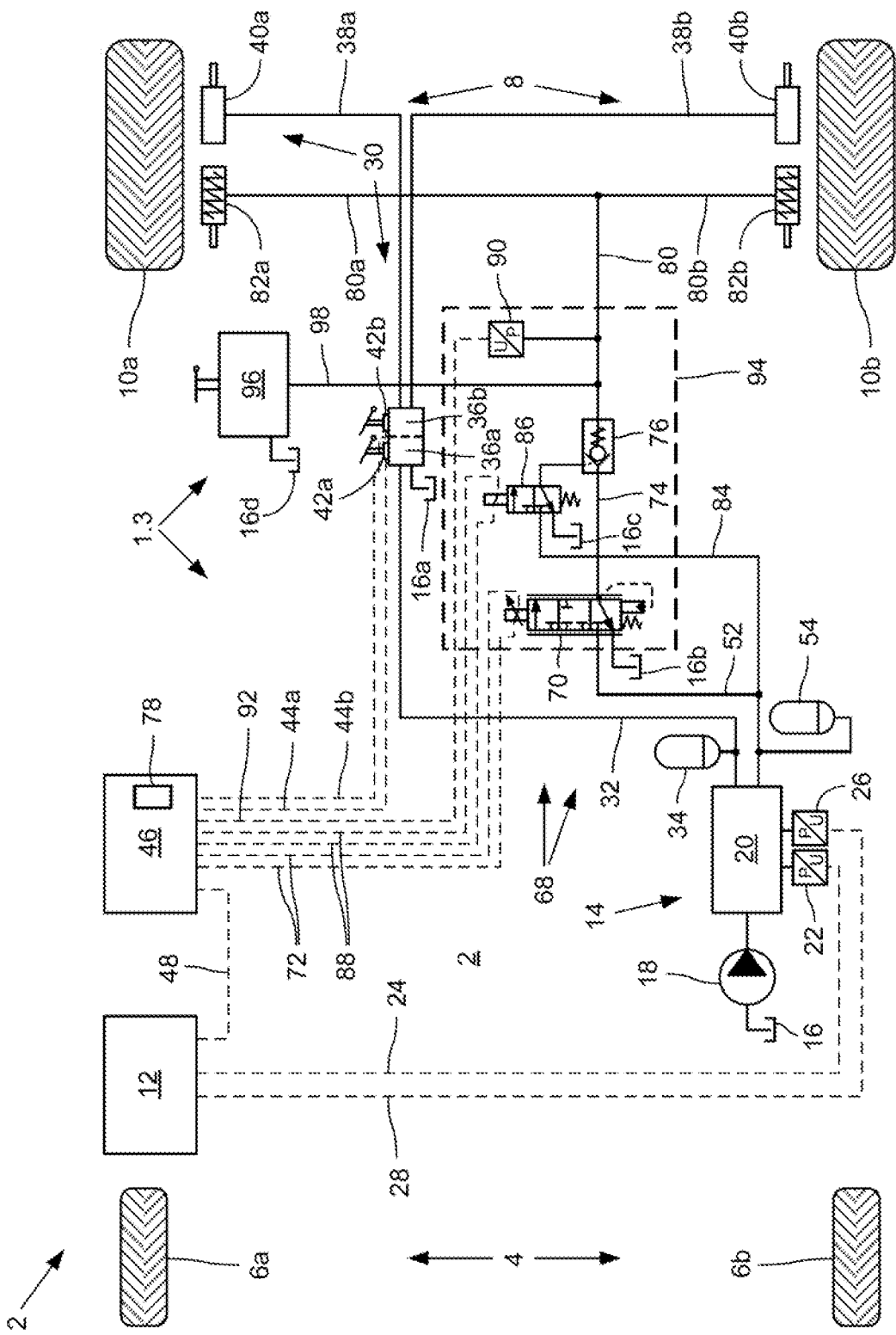
FIG. 3 shows a schematic view of a power brake system of a vehicle with a primary brake system according to FIG. 1 and a third embodiment of a secondary brake system according to the invention.

The vehicle 2 illustrated schematically in each case in FIGS. 1 to 3 is an agricultural tractor which has a non-driven front axle 4 with two front wheels 6a, 6b arranged on both sides and a rear axle 8 configured as a drive axle with two rear wheels 10a, 10b arranged on both sides. The vehicle 2 is equipped with a hydraulic primary brake system 30 and with a hydraulic secondary brake system 50, 50', 68. A hydraulic pressure medium source 14 has an oil pump 18, from which hydraulic oil can be delivered from a hydraulic collecting tank 16, and a hydraulic pressure medium preparation device 20, in which the delivered hydraulic oil is cleaned, cooled and passed to a first supply line 32 and a second supply line 52. A first hydraulic pressure sensor 22 and a second hydraulic pressure sensor 26 as well as a first hydraulic pressure accumulator 34 and a second hydraulic pressure accumulator 54 are respectively connected to these two supply lines 32, 52. The two pressure sensors 22, 26 are connected to a central electronic control unit 12 of the vehicle 2 via a first electrical sensor line 24 and a second electrical sensor line 28, respectively.

The primary brake system 30 can be used as a service brake system and as a steering brake system and has two brake circuits, which are in each case assigned to one side of the vehicle. The primary brake system 30 comprises the first supply line 32 with the associated hydraulic first pressure accumulator 34, two foot brake valves 36a, 36b, which can be actuated mechanically by the driver via a brake pedal in each case, and two brake lines 38a, 38b, to each of which a wheel brake cylinder 40a, 40b is connected. The two wheel brake cylinders 40a, 40b are configured as actively acting diaphragm or piston brake cylinders and are arranged on the wheel brakes of the rear wheels 10a, 10b.

In the function of the primary brake system 30 as a service brake system, the brake pedals are mechanically coupled to one another, and therefore, when one of the two brake pedals is actuated, both wheel brake cylinders 40a, 40b are supplied synchronously with the same brake pressure and the vehicle 2 is thereby braked in a track-stable manner. In the function as a steering brake system, the two brake pedals are mechanically separated, and therefore, when one of the two brake pedals is actuated, only the associated wheel brake cylinder (40a or 40b) is supplied with brake pressure, thereby assisting a cornering or turning maneuver of the vehicle 2 in the relevant direction.

The two foot brake valves 36a, 36b have a pressure medium inlet, a pressure medium outlet and in each case a brake pressure outlet. The first supply line 32 is connected to the pressure medium inlet. An unpressurized hydraulic collecting tank 16a is connected to the pressure medium outlet. The associated brake line 38a, 38b is connected to each of the two brake pressure outlets. By depressing the brake pedals, a respective axially movably mounted valve piston is moved within the foot brake valve 36a, 36b, and as a result the brake pressure acting in the respective brake line 38a, 38b and thus in the relevant wheel brake cylinder 40a, 40b is adjusted continuously between a zero pressure and a supply pressure prevailing in the supply line 32, and the braking force acting via the wheel brake cylinders 40a, 40b on the wheel brakes of the rear wheels 10a, 10b is thereby set.

The actuating travel of the respective valve piston is measured in each case by means of a displacement sensor 42a, 42b arranged on the two foot brake valves 36a, 36b and is transmitted here in each case via an electrical sensor line 44a, 44b to an electronic brake control unit 46, in which a braking value signal $S_{BW}$ can be formed from the respective actuating travel signal. The braking value signal $S_{BW}$ electrically represents the braking requirement or the braking demand of the driver and can assume any value between 0% for the absence of a braking demand and 100% for a maximum braking demand. The brake control unit 46 is connected to the central control unit 12 of the vehicle 2 via a data bus 48, such as a CAN bus.

The secondary brake system 50 shown in a first embodiment in FIG. 1 is electronically controllable and can be used at least as an auxiliary brake system, in the functioning of which the vehicle 2 can be safely braked in the event of a failure of the primary brake system 30. This secondary brake system 50 comprises the second supply line 52 with the associated hydraulic second pressure accumulator 54, a brake control valve 56, a working line or brake line 60 with two line branches 60a, 60b at the end, and a front wheel brake cylinder 62a, 62b connected in each case to one of these two line branches 60a, 60b. The two front wheel brake cylinders 62a, 62b are configured as actively acting diaphragm cylinders or piston brake cylinders and are arranged on the wheel brakes of the front wheels 6a, 6b.

The brake control valve 56 is configured as a 3/3-way proportional solenoid valve with a pressure medium inlet, a pressure medium outlet and a working port, in which the working port is continuously adjustable between connection to the pressure medium outlet and the pressure medium inlet. The pressure medium inlet is connected to the hydraulic pressure medium source 14 via the second supply line 52, the pressure medium outlet is connected to an unpressurized hydraulic collecting tank 16b, and the working port is connected to the two wheel brake cylinders 62a, 62b via the aforementioned brake line 60. The hydraulic collecting tanks 16, 16a, 16b shown separately in FIG. 1 may be a single collecting tank into which a suction line or return line is passed in each case.

By means of corresponding control of the brake control valve 56, the brake pressure $p_B$ present in the brake line 60 and in the wheel brake cylinders 62a, 62b connected thereto can be adjusted continuously between a minimum pressure corresponding to the ambient pressure and a maximum pressure corresponding to the supply pressure present in the second supply line 52. This is shown by way of example in the diagrams in FIGS. 1 and 2 for two vehicle types of different weights, which will be discussed in detail below.

The electromagnet of the brake control valve 56 is connected via an electrical control line 58 to that of the brake control unit 46 and can be controlled or energized directly by the latter. The working port of the brake control valve 56 is connected to the pressure medium outlet of the brake control valve 56 in the non-energized state and to the pressure medium inlet in the maximally energized state. In order to measure and monitor the working or brake pressure $p_B$ introduced into the brake line 60 via the brake control valve 56, an electrohydraulic pressure sensor 64 is connected to the brake line 60 leading to the front axle 4 and is connected to the brake control unit 46 via an electrical sensor line 66. The secondary brake system 50 according to FIG. 1 can thus be controlled purely electronically. The brake pressure $p_B$ in the brake control line 60 and in the wheel brake cylinders 62a, 62b connected to this brake control line 60 can accordingly be adjusted independently of the primary brake system 30 only in accordance with a braking value signal $S_{BW}$, which can be determined in the brake control unit 46 from the sensor signals of the displacement sensors 42a, 42b or in some other way.

The second embodiment of a secondary brake system 50' according to the invention shown in FIG. 2 differs from the first embodiment of the secondary brake system 50 according to FIG. 1 only by a different arrangement of the wheel brake cylinders 62a', 62b' assigned thereto, while functioning in the same way. This embodiment of the secondary brake system 50' comprises the second supply line 52 with the associated hydraulic second pressure accumulator 54, a brake control valve 56, a working line or brake line 60' with two line branches 60a', 60b' at the end, and a wheel brake cylinder 62a', 62b' connected in each case to one of the two line branches 60a', 60b'. The two wheel brake cylinders 62a', 62b' are likewise configured as actively acting diaphragm or piston brake cylinders, but are arranged on the wheel brakes of the rear wheels 10a, 10b in this embodiment. Owing to the common arrangement on the rear axle 8, these wheel brake cylinders 62a', 62b' of the secondary brake system 50' can be operatively connected to the same wheel brake elements, such as brake disks or brake drums, as the wheel brake cylinders 40a, 40b of the primary brake system 30.

Likewise, the wheel brake cylinders 62a', 62b' of this secondary brake system 50' and the wheel brake cylinders 40a, 40b of the primary brake system 30 can each be structurally combined in what are referred to as combination brake cylinders.

Figure 9:
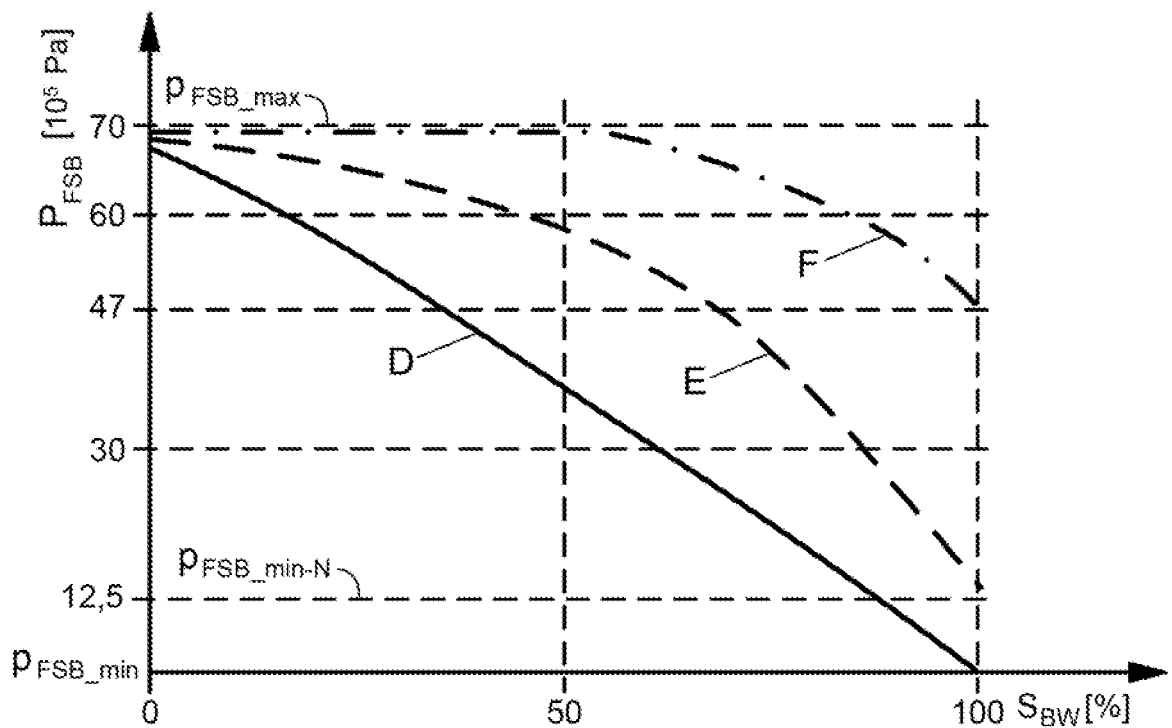
FIG. 9 shows in a diagram three characteristic curves D, E, F of the working pressure profile as a function of a signaled braking demand at the secondary brake system, said characteristic curves being valid for different operating modes of the secondary brake system with spring brake cylinders according to FIG. 3 for a first vehicle type, wherein these characteristic curves have an inverse profile in comparison with the characteristic curves A, B, C of FIG. 5.
Figure 10:
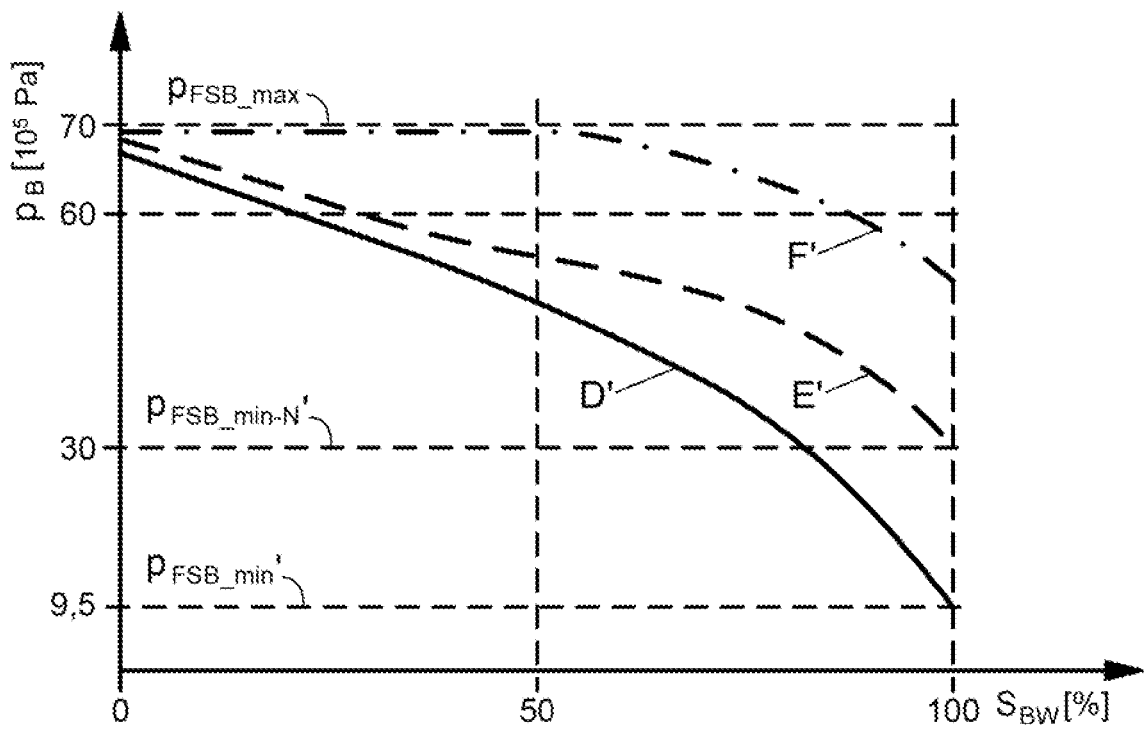
FIG. 10 shows in a diagram three characteristic curves D', E', F' of the working pressure profile as a function of a signaled braking demand at the secondary brake system, said characteristic curves being valid for different operating modes of the secondary brake system with spring brake cylinders according to FIG. 3 for a second vehicle type, wherein these characteristic curves partially have a different profile in comparison with the characteristic curves of FIG. 9.

The third embodiment of a secondary brake system 68 according to the invention depicted in FIG. 3 differs from the configuration of the second secondary brake system 50' according to FIG. 2 essentially in that the associated wheel brake cylinders 82a, 82b arranged on the rear axle 8 of the vehicle 2 are configured as passively acting spring brake cylinders. This requires control which is inverted in comparison with the two secondary brake systems 50, 50' which have already been presented and which have actively acting wheel brake cylinders 40a, 40b; 40a', 40b' since the wheel brakes in question are released with increasing working pressure $p_{FSB}$ and are applied with decreasing working pressure $p_{FSB}$. On the other hand, this enables the secondary brake system 68 according to FIG. 3 to be used not only as an auxiliary brake system but also as a parking brake system or parking brake. Brake pressure characteristic curves or working pressure characteristic curves for such a secondary brake system 50' according to FIG. 2 are illustrated in FIGS. 9 and 10, which will be discussed in detail below.

The secondary brake system 68 according to FIG. 3 comprises the second supply line 52 with the associated second hydraulic pressure accumulator 54, a brake control valve 70, an inlet-side working line 74, a controllable check valve 76 with a pilot valve 86 assigned thereto, an outlet-side working line 80 with two line branches 80a, 80b at the rear axle, and a spring brake cylinder 82a, 82b connected in each case to one of the two line branches 80a, 80b. The two spring brake cylinders 82a, 82b are arranged on the wheel brakes of the rear wheels 10a, 10b and can likewise be structurally combined with the wheel brake cylinders 40a, 40b of the primary brake system 30 in what are referred to as combination brake cylinders.

The brake control valve 70 of the secondary brake system 68 according to FIG. 3 is configured as a 3/3-way proportional solenoid valve with a pressure medium inlet, a pressure medium outlet and a working port, by means of which the working port is continuously adjustable between connection to the pressure medium outlet and the pressure medium inlet. The pressure medium inlet is connected to the hydraulic pressure medium source 14 via the second supply line 52, the pressure medium outlet is connected to an unpressurized hydraulic collecting tank 16b, and the working port is connected to the spring brake cylinders 82a, 82b via the aforementioned working lines 74, 80. The controllable check valve 76 is arranged in the inlet-side working line 74 in such a way as to shut off in the direction of the brake control valve 70. The electromagnet of the brake control valve 70 is connected electrically to the brake control unit 46 via an electrical control line 72 and can be controlled or energized directly by the latter. The working port of the brake control valve 70 is connected to the pressure medium outlet in the non-energized state and to the pressure medium inlet via its maximally provided passage in the maximally energized state.

The controllable check valve 76 is pressure-controlled and can be unlocked by applying pressure to its control inlet. By means of the pilot valve 86 assigned to the check valve 76, the control inlet of the check valve 76 can be connected alternately to the pressure medium source 14 or to an unpressurized hydraulic collecting tank 16c. The pilot valve 86 is configured as a 3/2-way solenoid switching valve with a pressure medium inlet, a pressure medium outlet and a control outlet. The pressure medium inlet of the pilot valve 86 is connected to the second supply line 52 via a connecting line 84, the pressure medium outlet is connected to the hydraulic collecting tank 16c, and the control outlet is connected to the control inlet of the check valve 76. The control outlet of the pilot valve 86 is connected to the pressure medium outlet in the non-energized state and to the pressure medium inlet in the energized state. The electromagnet of the pilot valve 86 can be controlled by the brake control unit 46 via an electrical control line 88.

The inlet-side working line 74 is connected to the outlet-side working line 80 via the controllable check valve 76. A hand pump 96 is connected to the outlet-side working line 80 via a pressure line 98 and can be used to pump hydraulic oil manually from an unpressurized hydraulic collecting tank 16d into the spring brake cylinders 82a, 82b on the rear axle. The hand pump 96 has a check valve (not illustrated), thus preventing unintentional venting via the hand pump 96. By means of the hand pump 96, the parking brake applied by means of the unpressurized spring brake cylinders 82a, 82b can be released in order, for example, to enable the vehicle 2 to be towed away if this is not possible in some other way on account of a fault.

The hydraulic collecting tanks 16, 16a, 16b, 16c, 16d shown separately in FIG. 3 may be a single collecting tank into which a suction line or return line is passed in each case. In order to measure and monitor the working pressure $p_{FSB}$ prevailing in the spring brake cylinders 82a, 82b on the rear axle, an electrohydraulic pressure sensor 90 is connected to the outlet-side working line 80 and is connected to the brake control unit 46 via an electrical sensor line 92.

In the third embodiment of the secondary brake system 68 according to FIG. 3, the brake control valve 70, the controllable check valve 76 with the associated pilot valve 86 and the pressure sensor 90 are structurally combined in a brake control module 94. By combining the aforementioned valves 70, 76, 86 and the pressure sensor 90 in the brake control module 94, their installation in the vehicle 2 is simplified and connection errors are avoided.

In the third embodiment of the secondary brake system 68 according to FIG. 3, too, the working pressure $p_{FSB}$ acting in the wheel brake cylinders 82a, 82b can be adjusted continuously between a minimum pressure corresponding to the ambient pressure and a maximum pressure $P_{FSB\_max}$ corresponding to the supply pressure present in the second supply line 52 by corresponding control of the brake control valve 70 by the electronic brake control unit 46. In this case, the controllable check valve 76 remains unactuated as the working pressure $p_{FSB}$ is increased; however, it must be unlocked by switching over the associated pilot valve 86 when the working pressure $p_{FSB}$ is reduced.

In the event of a failure of the electrical power supply to the electronic brake control unit 46 or in the event of an electronic fault, the fact that the check valve 76 is not then unlocked ensures that the working port of the brake control valve 70, which is unpressurized in this situation, is separated from the spring brake cylinders 82a, 82b. The effective working pressure $p_{FSB}$ is then trapped in the spring brake cylinders 82a, 82b, and therefore the current operating state of the secondary brake system 68 is maintained.

A significant advantage of the described secondary brake systems 50, 50', 68 according to FIGS. 1 to 3 is that, in these systems, the working pressure $p_B$, $p_{FSB}$ in the brake cylinders 62a, 62b; 62a', 62b', 82a, 82b can be set in an exclusively non-mechanical way, as a function of the current value of the braking value signal $S_{BW}$, by control of the respective brake control valve 56, 56', 70 or, in the case of the secondary brake system 68 according to FIG. 3, also additionally of the controllable check valve 76 connected downstream of the brake control valve 70. The working pressure $p_B$, $p_{FSB}$ in the brake cylinders 62a, 62b; 62a', 62b', 82a, 82b can in this case be set by corresponding energization of the respective brake control valve on the basis of characteristic curves which apply to different operating modes of the secondary brake system 50, 50', 68 or else to vehicles or vehicle types of different weights. These characteristic curves are matched to the respective vehicle 2 and to the components used in the secondary brake system 50, 50', 68 and are stored in a data memory 78, which is preferably assigned to the brake control unit 46.

Thus, secondary brake systems 50, 50', 68 according to the invention which are very largely identical in construction can be installed in different power brake systems 1.1, 1.2, 1.3, their components being taken into account by appropriate, respectively different control of the actuation of the brake control valve 56, 56', 70 there. Thus, in the case of a first power brake system according to the invention in a first vehicle type X, for example, the maximum accumulator pressure is $180 \times 10^5$ Pa, the brake pressure required for a maximum braking power is $50 \times 10^5$ Pa, and the maximum brake pressure which can be borne on account of the mechanics of the brake there is $80 \times 10^5$ Pa. In a second power brake system according to the invention in a second type of vehicle Y, the maximum accumulator pressure is, for example, $150 \times 10^5$ Pa, the brake pressure required for a maximum braking power is $30 \times 10^5$ Pa, and the maximum brake pressure which can be borne on account of the mechanics of the brake there is $40 \times 10^5$ Pa. An identical brake control valve 56, 56', 70 installed in the two power brake systems would then be dimensioned in such a way that, in the maximally energized state, it can output a working pressure of a maximum of $50 \times 10^5$ Pa at its pressure medium outlet. The working pressure requirement for a maximum braking power is thereby achieved in the brake system of the first vehicle type X. In the case of the secondary brake system of the second vehicle type Y, the maximum working pressure which can be output by the brake control valve is limited to $40 \times 10^5$ Pa. The respective maximum working pressure is determined by the maximum values in the curve profiles of the aforementioned characteristic curves, which are stored in the data memory 78 of the brake control unit 46.

Figure 4:
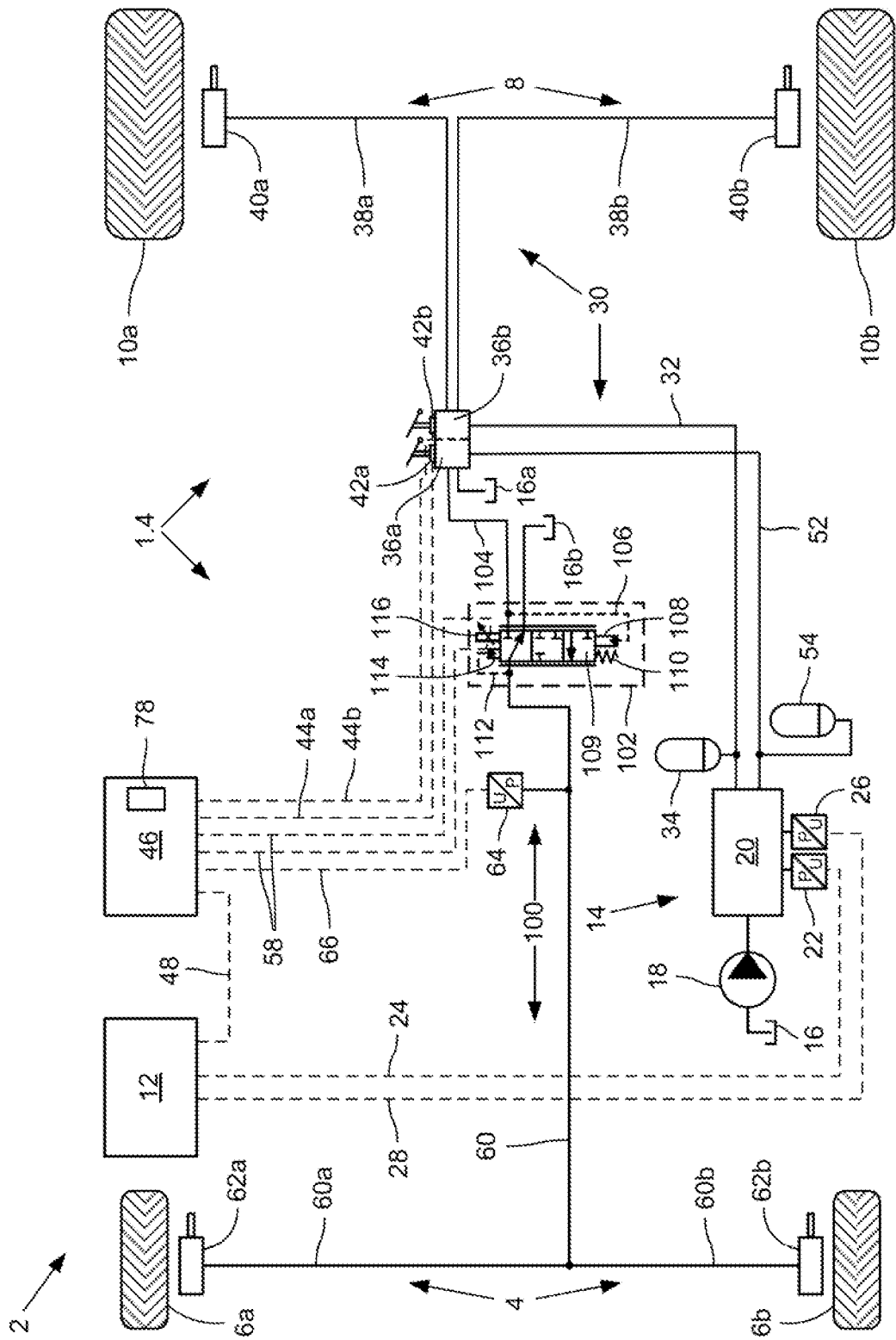
FIG. 4 shows a schematic view of a power brake system of a vehicle having a primary brake system according to FIG. 1 and a fourth embodiment of a secondary brake system according to the invention, the brake control valve of which is configured as a pressure-reducing valve.

As already mentioned, the fourth embodiment of a secondary brake system 100 according to the invention illustrated in FIG. 4 differs from the secondary brake systems 50, 50', 68 according to FIGS. 1 to 3 mainly in that the secondary brake system 100 has a brake control valve 102 configured as a pressure-reducing valve. Accordingly, this brake control valve 102 sets a brake pressure desired for the given vehicle and the present driving situation in that, in the event of increasing values of the braking value signal $S_{BW}$, it reduces the output brake pressure in accordance with the characteristic curves stored in the brake control unit 46 in comparison with the pressure introduced into the brake control valve 102. This situation is also illustrated in the diagrams in FIGS. 7 and 8, which will be discussed in detail below.

Accordingly, the primary brake system 30 can also be used as a service brake system and as a steering brake system in the case of the fourth power brake system 1.4 according to FIG. 4. The primary brake system 30 acts in a first brake circuit on the wheel brake cylinders 40a, 40b at the wheels 10a, 10b of the rear axle 8, while the secondary brake system 100 acts in a second brake circuit on the wheel brake cylinders 62a, 62b at the wheels 6a, 6b of the front axle 4. The primary brake system 30 comprises a first supply line 32 with an associated first hydraulic pressure accumulator 34, a second foot brake valve 36b, which can be actuated mechanically by the driver via a brake pedal, and two brake lines 38a, 38b connected to said valve, to each of which one of the rear wheel brake cylinders 40a, 40b is connected. The two wheel brake cylinders 40a, 40b are configured as actively acting diaphragm or piston brake cylinders. In addition, there is a first foot brake valve 36a, which can likewise be actuated by means of a brake pedal and belongs to the secondary brake system 100. The two brake pedals can be coupled mechanically to one another.

As mentioned, the first supply line 32 is connected to an inlet of the second foot brake valve 36b, by means of which the working pressure or brake pressure on the two wheel brake cylinders 40a, 40b in the region of the rear axle 8 can be set, as just described. The second supply line 52, which belongs to the secondary brake system 100, is connected to an associated second pressure accumulator 54 and to an inlet of the first foot brake valve 36a. A maximum working pressure or a maximum brake pressure for the two wheel brake cylinders 62a, 62b in the region of the front axle 4 can be set by means of this first foot brake valve 36a. This maximum working pressure for the front wheel brake cylinders 62a, 62b can have a value between the ambient pressure of the vehicle 2 and the supply pressure made available by the second pressure accumulator 54, although this maximum working pressure is usually below the supply pressure value present in the second pressure accumulator 54.

An unpressurized hydraulic collecting tank 16a is connected to a first outlet of the first foot brake valve 36a. A working pressure line 104 is connected to a second outlet of the first foot brake valve 36a, in which line the maximum working pressure for the two front wheel brake cylinders 62a, 62b, which is determined by the actuating position of the first foot brake valve 36a, can be transmitted to a pressure medium inlet of the brake control valve 102 configured as a pressure-reducing valve.

This brake control valve 102 is configured as a 3/3-way proportional valve with the aforementioned pressure medium inlet, a pressure medium outlet and a working port. As mentioned, the working pressure line 104 is connected to the pressure medium inlet of the brake control valve 102. The pressure medium outlet of the brake control valve 102 is connected to an unpressurized hydraulic collecting tank 16b, and the working line 60 leading to the front wheel brake cylinders 62a, 62b is connected to the working port.

The brake control valve 102 has an axially movable valve spool 109, on one axial end of which a valve spring 110 acts with a spring force. A first control pressure acts on the same axial end of the valve spool 109, being fed in via a first control pressure inlet 108. This first control pressure is fed in via an inlet control pressure line 106, the other end of which is connected to the pressure medium inlet of the brake control valve 102 or to the aforementioned working pressure line 104. A second control pressure, which can be fed to the valve spool 109 via a second control pressure inlet 114, acts on the axially opposite end of the valve spool 109. This second control pressure inlet 114 is connected via an outlet control pressure line 112 to the working port of the brake control valve 102 or to the working line 60 leading to the front wheel brake cylinders 62a, 62b. Finally, the valve spool 109 is acted upon by an electromagnetic actuator 116 of the brake control valve 102, the magnet coil of which, when energized, drives the valve spool 109 in the direction of the valve spring 110.

The mode of operation of this brake control valve 102 is such that, depending on the energization of the electromagnet of the associated actuator 116, it reduces the pressure present at the pressure medium inlet to a working or brake pressure for the front wheel brake cylinders 62a, 62b, which is provided at the working port. If the pressure at the working port or in the working pressure line 104 is $100 \times 10^5$ Pa and the electromagnet of the actuator 102 is not energized, then a working or brake pressure of $p_B = 100 \times 10^5$ Pa is likewise present at the working port of the brake control valve 102.

When the electromagnet of the actuator 116 is energized with 20% of its maximum current, a working pressure of $p_B = 80 \times 10^5$ Pa is present at the working port. If the electromagnet is energized with 40% of its maximum current, the working pressure at the working outlet of the brake control valve is $60 \times 10^5$ Pa. If the pressure in the inlet-side working pressure line 104 is set to $60 \times 10^5$ Pa by actuating the first foot brake valve 36a, then a pressure of $p_B = 20 \times 10^5$ Pa is present at the working port when the electromagnet 116 is energized with the same current of 40% of its maximum current. The brake control valve 102 of the fourth secondary brake system 100 according to FIG. 4 accordingly has a pressure-reducing effect when the electromagnet of the actuator 116 is energized. Therefore, by energizing the electromagnet of the actuator 102, a certain pressure value is not directly provided at the working port of the brake control valve 102, but a pressure present at its pressure medium inlet is reduced in a certain way and is thus transmitted as working or brake pressure to the front wheel brake cylinders 62a, 62b.

As a result, the rear wheel brake cylinders 40a, 40b connected to the primary brake system 30 are accordingly actuated purely mechanically by a driver of the vehicle by means of the second foot brake valve 36b, while the pressure prevailing in the front wheel brake cylinders 62a, 62b is set mechanically and electronically in combination. It is of particular importance here that the electronically controlled actuation of the brake control valve 102 can only bring about a reduction in the pressure which has been made available to the brake control valve 102 by the first foot brake valve 36a.

As mentioned, the fourth power brake system 1.4 according to FIG. 4 can also be used as a steering brake system. Here, it is decisive that the front wheels 6a, 6b of the vehicle 2 must not be braked during the performance of a steering brake action. This is achieved by virtue of the fact that the electromagnet 116 of the brake control valve 102 configured as a pressure-reducing valve is controlled electronically in such a way that said valve does not output any working pressure $p_B$ or only a working pressure corresponding to the atmospheric ambient pressure into the working pressure line 60. Since the implementation of this quasi-deactivation of the braking function of the wheel brake cylinders 62a, 62b at the front wheels 6a, 6b by means of a purely mechanically operating conventional foot brake valve would be possible only with great technical complexity, this fourth power brake system 1.4 offers the great advantage that with it the braking function of the wheel brake cylinders 62a, 62b at the front wheels 6a, 6b can be deactivated in a manner which is technically comparatively simple and accurate by means of the brake control valve 102.

In the following, it will be explained on the basis of several diagrams how the power brake systems 1.1, 1.2, 1.3, 1.4 presented in FIGS. 1 to 4 can be operated in an advantageous manner.

Figure 5:
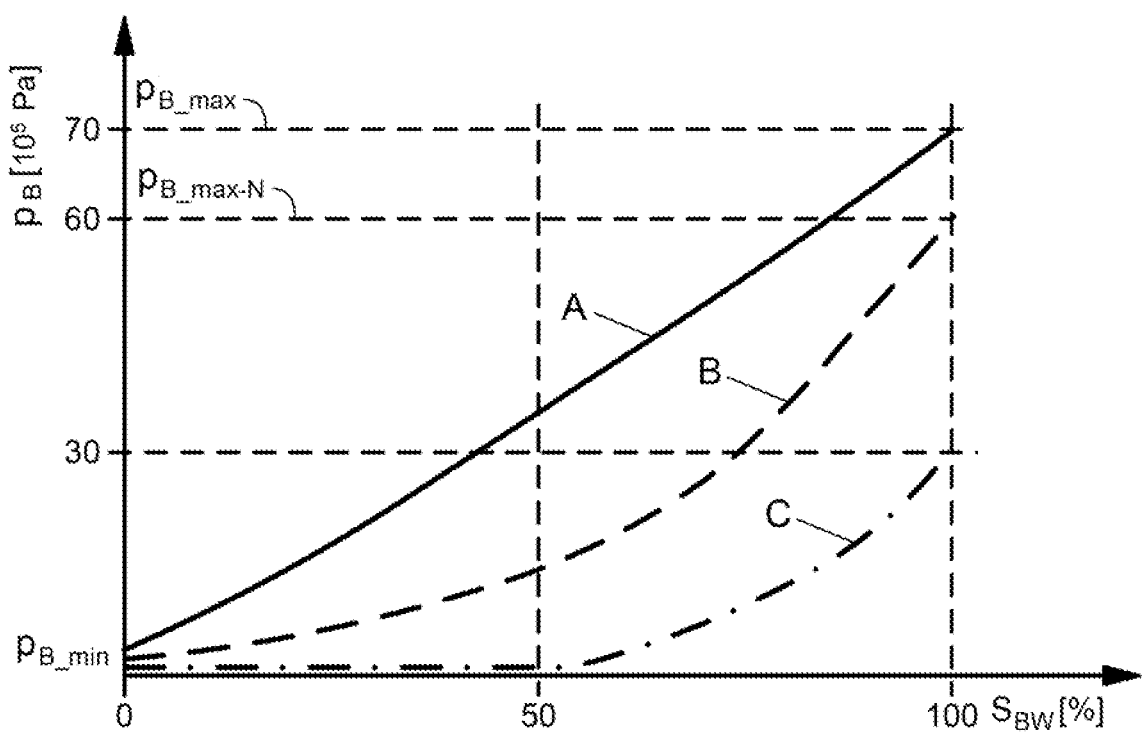
FIG. 5 shows a diagram with several working pressure characteristic curves A, B, C for different operating modes of the secondary brake system according to FIG. 1 or FIG. 2 of a heavy vehicle type.

In the diagram shown in FIG. 5, three characteristic curves A, B, C for controlling the secondary brake systems 50, 50' according to FIGS. 1 and 2, equipped with actively acting wheel brake cylinders 62a, 62b on a heavier vehicle are accordingly plotted by way of example. The energization of the actuator of the brake control valve 56, 70 there is controlled in accordance with these three characteristic curves A, B, C. The first three characteristic curves A, B, C represent the brake pressure $p_B$ to be input into the wheel brake cylinders 62a, 62b as a function of the current value of a braking value signal $S_{BW}$ for different operating modes of the secondary brake system 50, 50'. The braking value signal $S_{BW}$ can be determined, for example, from the actuating travel signal of the displacement sensor 42a, 42b arranged on one of the foot brake valves 36a, 36b. It represents the braking demand or braking requirement of the driver, where a value of 0% of the braking value signal indicates the absence of a braking demand and a value of 100% of the braking value signal indicates a maximum braking demand of the driver.

The first characteristic curve A applies to an emergency braking function of the secondary brake system 50, 50', during the use of which the service brake system 30 is assisted in braking by the secondary brake system 50, 50' or is replaced by the latter in respect of the braking of the vehicle 2. According to this first characteristic curve A, it is provided that the actuator of the brake control valve 56, 70 is energized in such a way that, starting from a minimum brake pressure $p_{B\_min}$ close to 0 Pa at a value of the braking value signal $S_{BW}$ of 0%, the working pressure $p_B$, which acts as the brake pressure, is then increased largely linearly as the value of the braking value signal $S_{BW}$ increases, up to a maximum brake pressure $p_{B\_max}$ of $70 \times 10^5$ Pa in the present case at a value of the braking value signal $S_{BW}$ of 100%. By virtue of the largely linear profile of the pressure increase and the associated linear increase in the braking force of the wheel brake cylinders 62a, 62b, the fastest possible increase in the braking effect is achieved.

The second characteristic curve B applies to an auxiliary braking function of the secondary brake system 50, 50', during the use of which the service brake system 30 is replaced in braking by the secondary brake system 50, 50'. According to this second characteristic curve B, it is provided that the actuator of the brake control valve 56, 70 is energized in such a way that, starting from the minimum brake pressure $p_{B\_min}$ at a value of the braking value signal $S_{BW}$ of 0%, the working pressure $p_B$ is increased progressively as the value of the braking value signal increases, up to a maximum brake pressure in normal operation $p_{B\_max-N}$ at a braking value signal $S_{BW}$ of 100%. This maximum brake pressure in normal operation $p_{B\_max-N}$ is below the maximum brake pressure $p_{B\_max} = 70 \times 10^5$ Pa at $p_{B\_max-N} = 60 \times 10^5$ Pa. By means of the progressive profile of the brake pressure increase and the associated progressive increase in the braking force of the wheel brake cylinders 62a, 62b, the change in the braking effect is matched to the customary comfortable behavior of a pressure-controlled primary brake system.

The third characteristic curve C applies to an additional braking function of the secondary brake system 50, 50', during the use of which the service brake system 30 is assisted in braking by the secondary brake system 50, 50' in the case of higher braking value signals of, in the present case, $S_{BW} \geq 54\%$. According to this third characteristic curve C, it is provided that the actuator of the brake control valve 56, 70 is energized in such a way that, starting from the minimum brake pressure $p_{B\_min}$ at a value of the braking value signal of $S_{BW}=0\%$, the working pressure $p_B$ is increased progressively from a defined starting value of the braking value signal of $S_{BW\_Start}=54\%$ as the values of the braking value signal continue to increase, up to a working pressure $p_B$, which is between the minimum brake pressure $p_{B\_min}$ and the maximum brake pressure in normal operation $P_{B\_max-N}$, to $p_B=30\times10^5$ Pa at a braking value signal $S_{BW}$ of 100%. Here too, by means of the progressive profile of the pressure increase and the associated progressive increase in the braking force of the wheel brake cylinders 62a, 62b, the supportive braking effect of the secondary brake system 50, 50' in conjunction with the braking effect of the primary brake system 30 is matched to the customary comfortable behavior of a pressure-controlled primary brake system with stronger wheel brakes.

Figure 6:
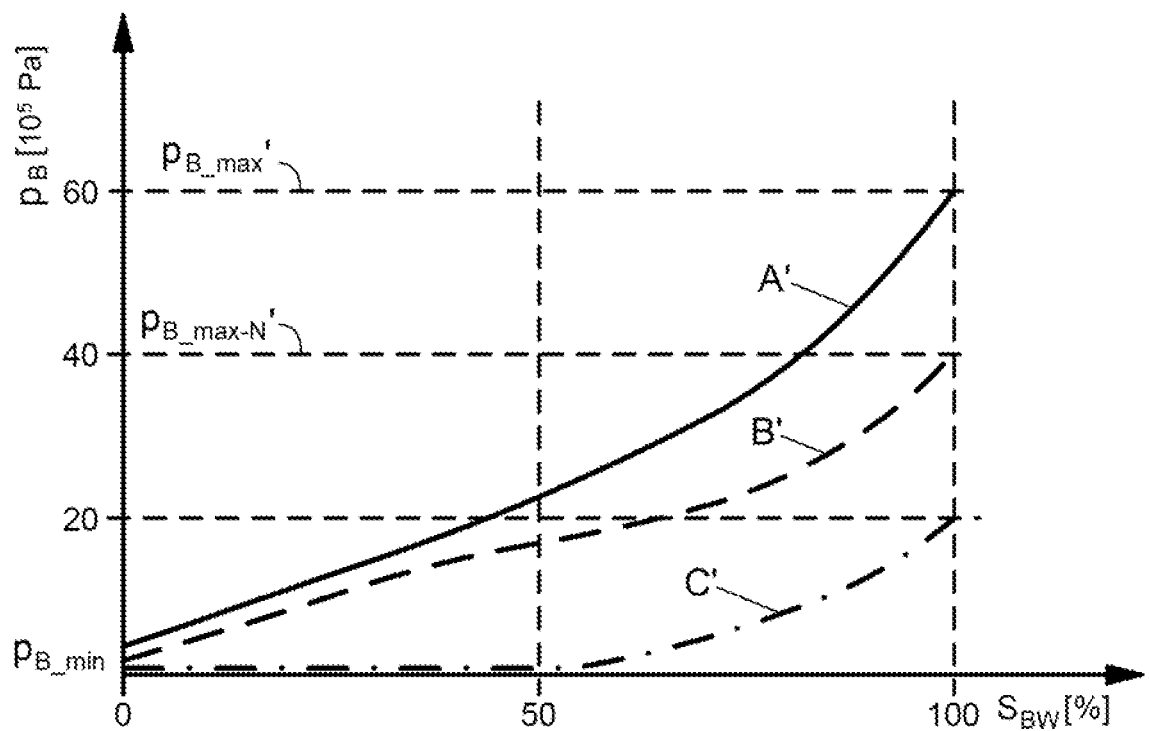
FIG. 6 shows a diagram with several working pressure characteristic curves A', B', C' for different operating modes of the secondary brake system according to FIG. 1 or FIG. 2 of a light vehicle type.

In order to avoid an excessive braking deceleration of a lighter vehicle and an unnecessarily high load on the wheel brakes of the secondary brake system 50, 50', fourth, fifth and sixth characteristic curves A', B', C' according to FIG. 6 for a light vehicle or a vehicle with a low load, in comparison with the first to third characteristic curves A, B, C according to FIG. 5 for a heavy vehicle or a vehicle with a high load, in each case have a profile which is reduced in the direction of the minimum working pressure $p_{B\_min}$ by way of the values of the braking value signal $S_{BW}$ as well as having lower maximum values of the working pressure $p_B$. The diagram in FIG. 6 accordingly shows fourth, fifth and sixth characteristic curves A', B', C' of a secondary brake system 50, 50' of a lighter vehicle, the pressure level of which curves is correspondingly lowered. The maximum brake pressure is $p_{B\_max}'$; =60×10⁵ Pa and the maximum brake pressure in normal operation is $p_{B\_max-N}=40\times10^5$ Pa.

The three characteristic curves A, B, C according to FIG. 1 and FIG. 2 for controlling the brake control valve 56 and thus the secondary brake system 50, 50' can be permanently predefined and stored in the data memory 78 of the electronic brake control unit 46. They serve there for controlling the energization of the electromagnetic actuator of the brake control valve 56. However, it is also possible for the second characteristic curve B and the third characteristic curve C for the auxiliary braking function and for the additional braking function, respectively, to be generated from the first characteristic curve A for the emergency braking function of the secondary brake system 50, 50' by means of a transfer function with variable reduction of the working pressure $p_B$ by way of the values of the braking value signal $S_{BW}$, wherein the reduction of the working pressure $p_B$ is greater at low values of the braking value signal ($S_{BW} \leq 50\%$) than at high values of the braking value signal ($S_{BW} > 50\%$). This procedure for determining the second and third characteristic curves B, C from the first characteristic curve A is illustrated graphically in the diagram of FIG. 7 by arrows and by the negative percentage values entered there.

Figure 8:
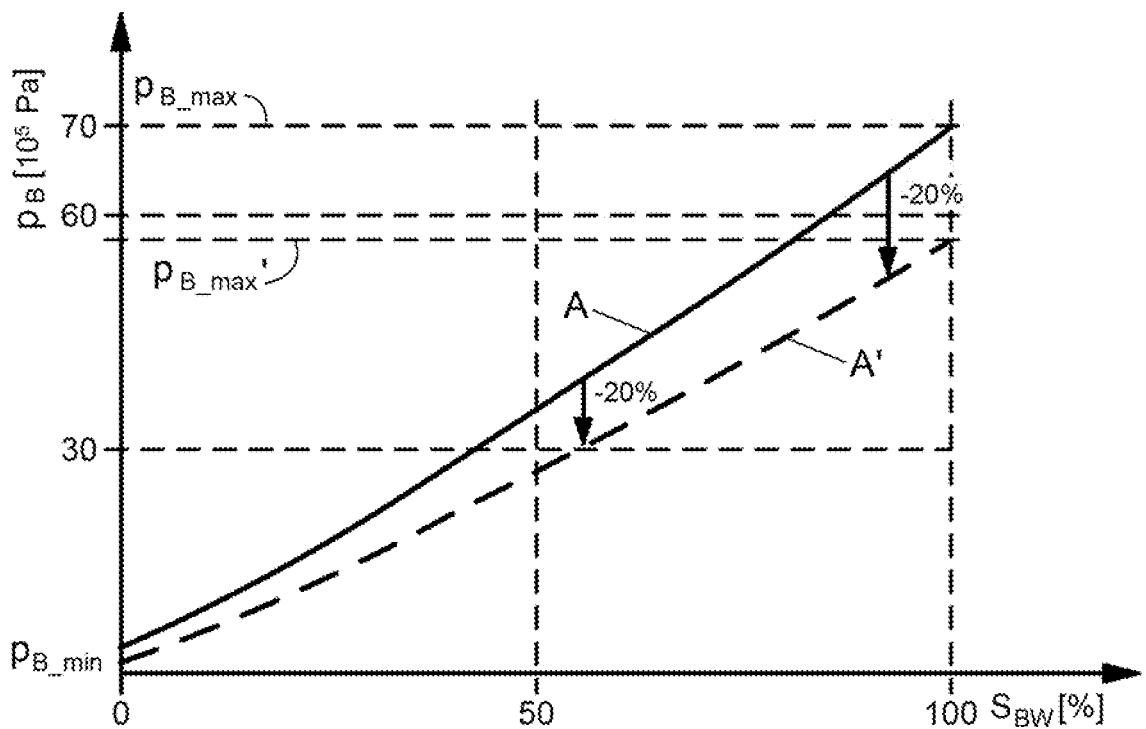
FIG. 8 shows a diagram with a first working pressure characteristic curve A, which shows the maximum working pressure profile according to FIG. 7, as well as a second working pressure characteristic curve A' for a lowered maximum working pressure profile over the braking demand for a second vehicle type, which can be set by means of the brake control valve configured as a pressure-reducing valve according to FIG. 4.

The diagram in FIG. 8, using the example of the first characteristic curve A and the fourth characteristic curve A' for the emergency braking function, illustrates that the fourth to sixth characteristic curves A', B', C' for a light vehicle or a vehicle with a low load can be generated from the corresponding first three characteristic curves A, B, C for a heavy vehicle or a vehicle with a high load by means of a reduction in the working pressure $p_B$, which is proportional to the vehicle weight, by way of the values of the braking value signal $S_{BW}$ of, in this case, 20%. Accordingly, a different type of vehicle can be operated with the same brake system according to the invention as those of FIGS. 1 to 3, provided that an appropriate reduction in working pressure is made.

The diagram shown in FIG. 9 shows, by way of example, three further characteristic curves, namely the seventh to ninth characteristic curves D, E, F, for the secondary brake system 68 according to FIG. 3, which is equipped with passively acting wheel brake cylinders 82a, 82b. These passively acting wheel brake cylinders 82a, 82b are, for example, spring brake cylinders. The seventh to ninth characteristic curves D, E, F represent the working pressure $p_{FSB}$ to be input into the wheel brake cylinders 82a, 82b as a function of the current value of a braking value signal $S_{BW}$ for different operating modes of the secondary brake system 68. The electromagnet of the actuator of the brake control valve is energized in accordance with these characteristic curves.

The seventh characteristic curve D in FIG. 9 applies to an emergency braking function of the secondary brake system 68, during the use of which the service brake system 30 is assisted in braking by the secondary brake system 68 or is replaced by the latter. According to this seventh characteristic curve D, it is provided that, starting from a maximum working pressure $p_{FSB\_max}$ of, in the present case, 70×10⁵ Pa at a braking value signal $S_{BW}$ of 0%, the working pressure $p_{FSB}$ is reduced largely linearly as the values of the braking value signal increase, to a minimum working pressure $p_{FSB\_min}$ close to 0 Pa at a value of the braking value signal $S_{BW}$ of 100%. By virtue of the largely linear profile of the pressure reduction and the associated linear increase in the braking force of the spring brake cylinders 82a, 82b, the fastest possible increase in the braking effect is achieved. In this case, a minimum deceleration of the vehicle of at least 2.2 m/s² is very clearly exceeded.

The eighth characteristic curve E applies to an auxiliary braking function of the secondary brake system 68, during the use of which the service brake system 30 is replaced by the secondary brake system 68 in respect of the braking effect on the vehicle 2. According to this eighth characteristic curve E, it is provided that, starting from a maximum working pressure of, in the present case, 70×10⁵ Pa at a value of the braking value signal $S_{BW}$ of 0%, the working pressure $p_{FSB}$ is reduced progressively as the values of the braking value signal increase, to a working pressure $p_{FSB}$ that is above the minimum working pressure $p_{FSB\_min}$ of, in this case, 12.5×10⁵ Pa at a braking value signal of $S_{BW}=100\%$. By means of the progressive profile of the pressure reduction and the associated progressive increase in the braking force of the spring brake cylinders 82a, 82b, the change in the braking effect is matched to the customary behavior of a pressure-controlled primary brake system. Here too, a minimum deceleration of the vehicle of at least 2.2 m/s² is reliably achieved.

The ninth characteristic curve F applies to an additional braking function of the secondary brake system 68, during the use of which the service brake system 30 is assisted in braking by the secondary brake system 68 in the case of higher braking value signals of, in the present case, $S_{BW} \geq 54\%$. According to this ninth characteristic curve F, it is provided that, starting from a maximum working pressure of, in the present case, $P_{FSB\_max}=70\times10^5$ Pa at a braking value signal $S_{BW}$ of 0%, the working pressure $p_{FSB}$ is reduced progressively from a defined starting value of the braking value signal of, in this case, $S_{BW\_Start}=54\%$ as the values of the braking value signal increase, to a working pressure $p_{FSB}$ which is between the maximum working pressure $p_{FSB\_max}$ and the minimum working pressure in normal operation $p_{FSB\_min-N}$, here to $p_{FSB}=47\times10^5$ Pa at a braking value signal $S_{BW}$ of 100%. Here too, by means of the progressive profile of the pressure reduction and the associated progressive increase in the braking force of the spring brake cylinders 82a, 82b, the supportive braking effect of the secondary brake system 68 in conjunction with the braking effect of the primary brake system 30 is matched to the customary behavior of a pressure-controlled primary brake system with stronger wheel brakes.

In order to avoid an excessive braking deceleration of a lighter vehicle and an unnecessarily high load on the wheel brakes of the secondary brake system 68, tenth, eleventh and twelfth characteristic curves D', E', F' according to FIG. 10 for a light vehicle or a vehicle with a low load, in comparison with the corresponding seventh to ninth characteristic curves D, E, F according to FIG. 9 for a heavy vehicle or a vehicle with a high load, in each case have a profile of the working pressure $p_{FSB}$ which is raised in the direction of the maximum working pressure $p_{FSB\_max}$ by way of the increasing values of the braking value signal $S_{BW}$. Tenth to twelfth characteristic curves D', E', F', with a correspondingly increased pressure level, of a secondary brake system 68 of a lighter vehicle with a minimum working pressure $p_{FSB\_min'}$ raised to $9.5\times10^5$ Pa and a minimum working pressure in normal operation $p_{FSB\_min-N'}$ raised to $30\times10^5$ Pa are illustrated in the diagram of FIG. 10. If a lighter vehicle were equipped with weaker spring brake cylinders, the tenth, eleventh and twelfth characteristic curves D', E', F' would be displaced in the direction of the minimum working pressure $p_{FSB}=0$ Pa in accordance with the lower spring stiffness of the brake springs, and the pressure level of the working pressure $P_{FSB}$ as a whole would thus be lowered.

LIST OF REFERENCE SIGNS (PART OF THE DESCRIPTION)

Figure 7:
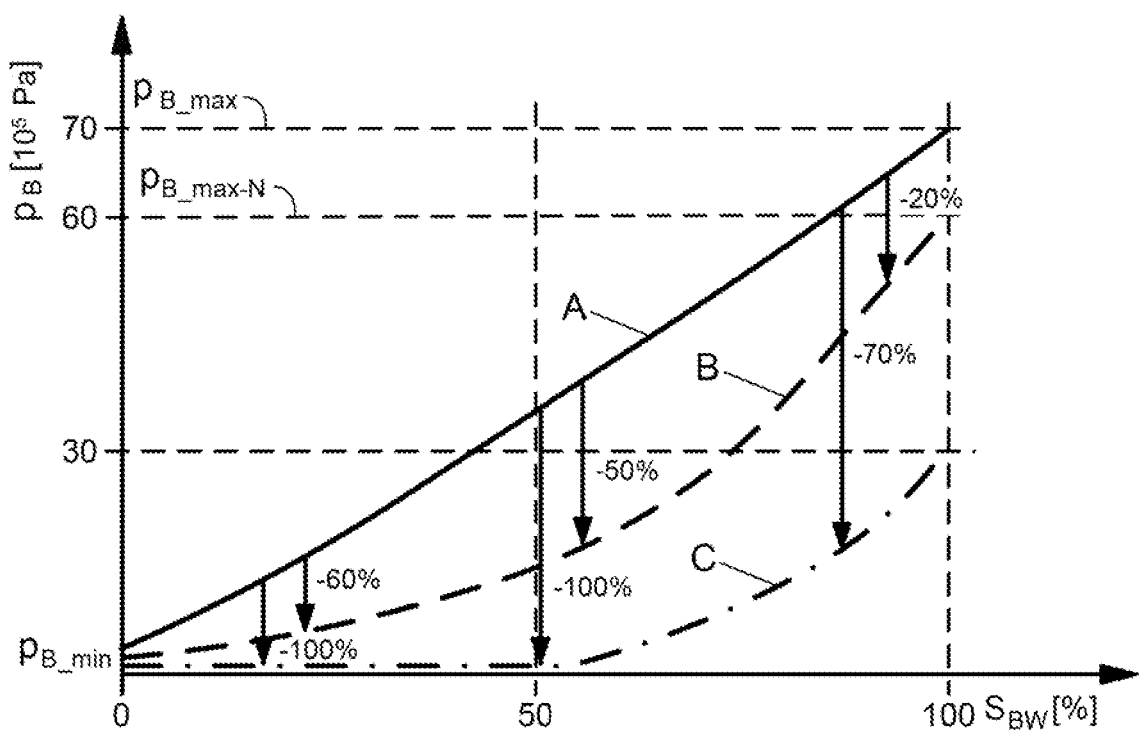
FIG. 7 shows a diagram with a first working pressure characteristic curve A, which characterizes a maximum working pressure profile as a function of a signaled braking demand at the secondary brake system according to FIG. 4 of a first vehicle type, as well as two further working pressure characteristic curves B, C, which in comparison thereto each have a pressure profile reduced by means of a brake control valve configured as a pressure-reducing valve according to FIG. 4.

1.1 power brake system (first embodiment)
1.2 power brake system (second embodiment)
1.3 power brake system (third embodiment)
1.4 power brake system (fourth embodiment)
2 vehicle, agricultural tractor
4 front axle
6a, 6b two front wheels
8 rear axle, drive axle
10a, 10b two rear wheels
12 electronic control unit
14 pressure medium source
16 pressure medium sink, collecting tank
16a, 16b first and second pressure medium sinks, collecting tanks
16c, 16d third and fourth pressure medium sinks, collecting tanks
18 oil pump
20 pressure medium preparation device
22 first pressure sensor
24 first sensor line
26 second pressure sensor
28 second sensor line
30 primary brake system, service brake system
32 first supply line
34 first pressure accumulator
36a, 36b first and second foot brake valves
38a, 38b first and second brake lines
40a, 40b first and second wheel brake cylinders at rear axle wheels
42a first displacement sensor
42b second displacement sensor
44a sensor line on displacement sensor 42a
44b sensor line on displacement sensor 42b
46 brake control unit
48 data bus, CAN bus
50 first secondary brake system, auxiliary brake system
50' second secondary brake system, auxiliary brake system
52 second supply line
54 second pressure accumulator
56 brake control valve
58 control line
60, 60' working line, brake line
60a, 60b two front-axle line branches of the secondary brake system 50
60a', 60b' two rear-axle line branches of the secondary brake system 50'
62a, 62b two wheel brake cylinders at front axle wheels
62a', 62b' two wheel brake cylinders at rear axle wheels
64 third pressure sensor
66 third sensor line
68 third secondary brake system, auxiliary and parking brake system
70 brake control valve
72 control line
74 inlet-side working line
76 controllable check valve
78 data memory
80 outlet-side working line
80a first rear-axle line branch of the secondary brake system 68
80b second rear-axle line branch of the secondary brake system 68
82a first wheel brake cylinder, first spring brake cylinder
82b second wheel brake cylinder, second spring brake cylinder
84 connecting line
86 pilot valve
88 control line
90 fourth pressure sensor
92 sensor line
94 pressure control module
96 hand pump
98 pressure line
100 fourth secondary brake system, auxiliary brake system
102 brake control valve (configured as a pressure-reducing valve)
104 working pressure line
106 inlet pressure control line
108 first control pressure inlet
109 valve spool
110 valve spring
112 outlet pressure control line
114 second control pressure inlet
116 electromagnetic actuator on the brake control valve 102
$a_{Br}$ braking deceleration
A first characteristic curve
B second characteristic curve
C third characteristic curve
A' fourth characteristic curve
B' fifth characteristic curve
C' sixth characteristic curve
D seventh characteristic curve
E eighth characteristic curve
F ninth characteristic curve D' tenth characteristic curve
E' eleventh characteristic curve
F' twelfth characteristic curve
$P_B$ working pressure, brake pressure
$P_{B\_max}$ maximum brake pressure according to FIG. 5
$p_{B\_max}$' maximum brake pressure according to FIG. 7
$p_{B\_min}$ minimum brake pressure according to FIG. 5
$P_{B\_max-N}$ maximum brake pressure in normal operation according to FIG. 5
pB_max-N' maximum brake pressure in normal operation according to FIG. 6
$P_{FSB}$ working pressure, brake release pressure
$P_{FSB\_max}$ maximum working pressure according to FIG. 9
$P_{FSB\_min}$ minimum working pressure according to FIG. 9
$P_{FSB\_min}$' minimum working pressure according to FIG. 10
$P_{FSB\_min-N}$ minimum working pressure according to FIG. 9
$P_{FSB\_min-N}$' minimum working pressure according to FIG. 10
$S_{BW}$ value of the braking value signal
$S_{BW\_Start}$ starting value of the braking value signal
$v_{max}$ permissible maximum speed

The invention claimed is:

1. A power brake system (1.1, 1.2, 1.3, 1.4) of a vehicle (2), comprising:
 a pressure medium source (14),
 a pressure-medium-operated primary brake system (30), which can be used as a service brake and steering brake system, the primary brake system (30) including at least one foot brake valve (36a, 36b) and at least two wheel brake cylinders (40a, 40b) arranged on opposite sides on a drive axle (8) and configured to be actuated independently of one another,
 a pressure-medium-operated secondary brake system (50; 50'; 68; 100) operable independently of the primary brake system (30) and configured to be used at least as an auxiliary brake system, the secondary brake system (50; 50'; 68; 100) including a brake control valve (56; 70; 102) and at least one brake cylinder (62a, 62b; 62a', 62b'; 82a, 82b), acting on wheel brakes of a vehicle axle (4, 8),
 wherein the secondary brake system (50; 50'; 68; 100) is electronically controllable and includes:
 the brake control valve (56; 70; 102) configured as a solenoid valve for setting a braking force of by feeding or removing pressure medium to or from the at least one brake cylinder (62a, 62b; 62a', 62b'; 82a, 82b),
 a pressure sensor (64; 90) connected to a working line (60; 60'; 74, 80) leading to the at least one brake cylinder (62a, 62b; 62a', 62b'; 82a, 82b), and
 an electronic brake control unit (46) for evaluating a pressure signal of the pressure sensor (64; 90) and for controlling the brake control valve (56; 70; 102) in accordance with a braking value signal ($S_{BW}$);
 wherein the brake control unit (46) is assigned a non-volatile data memory (78), storing characteristic curves (A, B, C; D, E, F), for different operating modes, for setting a working pressure ($p_B$, $p_{FSB}$) in the at least one brake cylinder (62a, 62b; 62a', 62b'; 82a, 82b) in accordance with the braking value signal ($S_{BW}$) or for calculating further characteristic curves (A', B', C', D', E', F');
 wherein the characteristic curves are stored and correspond to different operating modes and/or vehicle types, wherein the working pressure is set as a function of the braking value signal according to a specific one of the stored characteristic curves that corresponds to the operating mode and/or the vehicle type.

2. The power brake system (1.1, 1.2, 1.3) as claimed in claim 1,
 wherein the brake control valve (56; 70) is a 3/3-way proportional valve with a pressure medium inlet, a pressure medium outlet and a working port,
 wherein the working port is continuously adjustable between connection to the pressure medium outlet and the pressure medium inlet, wherein the pressure medium inlet is connected to a pressure medium source (14) via a supply line (52),
 wherein the pressure medium outlet is connected to a pressure medium sink (16b),
 wherein the working port is connected to the at least one brake cylinder (62a, 62b; 62a', 62b'; 82a, 82b) via the working line (60; 60'; 74, 80),
 and the working port of the brake control valve (56; 70) is connected to the pressure medium outlet in a non-energized state of the brake control valve (56; 70) and to the pressure medium inlet in a maximally energized state of the brake control valve (56; 70).

3. The power brake system (1.1, 1.2) as claimed in claim 1, wherein the secondary brake system (50; 50') includes at least two brake cylinders (62a, 62b; 62a', 62b') configured as active diaphragm or piston brake cylinders, the at least two brake cylinders (62a, 62b; 62a', 62b') being arranged as wheel brake cylinders on opposite sides on the wheel brakes of the drive axle (8) or of a non-driven vehicle axle (4).

4. The power brake system (1.3) as claimed in claim 1, wherein the secondary brake system (68) has at least two brake cylinders (82a, 82b) configured as passively acting spring brake cylinders, the at least two brake cylinders (82a, 82b) being arranged as wheel brake cylinders on opposite sides on the wheel brakes of the drive axle (8) or of a non-driven vehicle axle (4).

5. The power brake system as claimed in claim 1, wherein the at least one brake cylinder of the secondary brake system is a passively acting brake cylinder (82a, 82b), the at least one brake cylinder (82a, 82b) being arranged as an axle brake cylinder on a shaft brake of a central output shaft of a powertrain.

6. The power brake system (1.1, 1.2, 1.3, 1.4) as claimed in claim 1, further comprising a pressure medium sink (16) in the secondary brake system (50; 50', 68),
 wherein the secondary brake system (50; 50', 68) is a hydraulic brake system,
 wherein the pressure medium source (14) has an oil pump (18), a hydraulic pressure preparation device (20) and a second hydraulic pressure accumulator (54), and
 wherein the pressure medium sink (16) is formed by at least one hydraulic collecting tank.

7. The power brake system as claimed in claim 1, further comprising a pressure medium sink in the secondary brake system,
 wherein the secondary brake system is configured as an air brake system,
 the pressure medium source has a compressor, a pneumatic pressure preparation device and a pneumatic pressure accumulator,
 and the pressure medium sink is formed by at least one vent outlet.

8. A power brake system (1.4) of a vehicle (2), comprising:
 a pressure medium source (14),
 a pressure-medium-operated primary brake system (30), which can be used as a service brake and steering brake system, the primary brake system (30) including at least one foot brake valve (36a, 36b) and at least two wheel brake cylinders (40a, 40b) arranged on opposite sides on a drive axle (8) and configured to be actuated independently of one another, a pressure-medium-operated secondary brake system (50; 50'; 68; 100) operable independently of the primary brake system (30) and configured to be used at least as an auxiliary brake system, the secondary brake system (50; 50'; 68; 100) including a brake control valve (56; 70; 102) and at least one brake cylinder (62a, 62b; 62a', 62b'; 82a, 82b), acting on wheel brakes of a vehicle axle (4, 8), wherein the secondary brake system (50; 50'; 68; 100) is electronically controllable and includes:

the brake control valve (56; 70; 102) configured as a solenoid valve for setting a braking force of by feeding or removing pressure medium to or from the at least one brake cylinder (62a, 62b; 62a', 62b'; 82a, 82b), a pressure sensor (64; 90) connected to a working line (60; 60'; 74, 80) leading to the at least one brake cylinder (62a, 62b; 62a', 62b'; 82a, 82b), and an electronic brake control unit (46) for evaluating a pressure signal of the pressure sensor (64; 90) and for controlling the brake control valve (56; 70; 102) in accordance with a braking value signal ($S_{BW}$);

wherein the brake control valve (102) is a 3/3-way proportional valve with a pressure medium inlet, a pressure medium outlet and a working port, wherein the working port is continuously adjustable between a connection to the pressure medium outlet and to the pressure medium inlet, wherein the pressure medium inlet is connected to the pressure medium source (14) via a foot brake valve (36a) arranged between two supply pressure lines (52, 104), wherein the pressure medium outlet is connected to a pressure medium sink (16b), wherein the working port is connected to the at least one brake cylinder (62a, 62b) via the working line (60), wherein the pressure medium inlet is connected via an inlet pressure control line (106) to a first control pressure inlet (108), which acts on a first axial end of a valve spool (109) of the brake control valve (102), wherein the pressure medium outlet is connected via an outlet pressure control line (112) to a second control pressure inlet (114) acting on a second axial end of the valve spool (109) of the brake control valve (102), wherein a valve spring (110) acts on a first axial end of the brake control valve (102), wherein an electromagnetic actuator (116) acts on a second axial end of the brake control valve (102), and wherein, by energizing the actuator (116), a working pressure applied to the pressure medium outlet is reduced in comparison with a supply pressure applied to the pressure medium inlet.

9. A power brake system (1.3) of a vehicle (2), comprising:

a pressure medium source (14), a pressure-medium-operated primary brake system (30), which can be used as a service brake and steering brake system, the primary brake system (30) including at least one foot brake valve (36a, 36b) and at least two wheel brake cylinders (40a, 40b) arranged on opposite sides on a drive axle (8) and configured to be actuated independently of one another, a pressure-medium-operated secondary brake system (50; 50'; 68; 100) operable independently of the primary brake system (30) and configured to be used at least as an auxiliary brake system, the secondary brake system (50; 50'; 68; 100) including a brake control valve (56; 70; 102) and at least one brake cylinder (62a, 62b; 62a', 62b'; 82a, 82b), acting on wheel brakes of a vehicle axle (4, 8), wherein the secondary brake system (50; 50'; 68; 100) is electronically controllable and includes:

the brake control valve (56; 70; 102) configured as a solenoid valve for setting a braking force of by feeding or removing pressure medium to or from the at least one brake cylinder (62a, 62b; 62a', 62b'; 82a, 82b), a pressure sensor (64; 90) connected to a working line (60; 60'; 74, 80) leading to the at least one brake cylinder (62a, 62b; 62a', 62b'; 82a, 82b), and an electronic brake control unit (46) for evaluating a pressure signal of the pressure sensor (64; 90) and for controlling the brake control valve (56; 70; 102) in accordance with a braking value signal ($S_{BW}$);

wherein for maintaining a working pressure ($p_{FSB}$) in the at least one brake cylinder, a controllable check valve (76) blocking a flow toward the brake control valve (70) is arranged in the working line (74).

10. The power brake system (1.3) as claimed in claim 9, wherein the controllable check valve (76) has a control inlet that is pressure-controlled and configured to be unlocked by applying pressure to the control inlet, wherein the check valve (76) cooperates with a pilot valve (86) configured to connect b the control inlet of the check valve (76) alternately to the pressure medium source (14) or to a pressure medium sink (16c).

11. The power brake system (1.3) as claimed in claim 10, wherein the pilot valve (86) is configured as a 3/2-way solenoid switching valve with a pressure medium inlet, a pressure medium outlet and a control outlet, wherein the pressure medium inlet is connected to the supply line (52) via a connecting line (84), wherein the pressure medium outlet is connected to the pressure medium sink (16c), wherein the control outlet is connected to the control inlet of the check valve (76), wherein the control outlet of the pilot valve (86) is connected to the pressure medium outlet in a non-energized state and to the pressure medium inlet in an energized state, and wherein the electromagnet of the pilot valve (86) is connected to the brake control unit (46) via an electrical control line (88).

12. The power brake system (1.3) as claimed in claim 10, wherein at least the brake control valve (70), the check valve (76) and the pilot valve (86) are combined in a brake control module (94).

13. A method for controlling a pressure-medium-operated secondary brake system (50; 50', 68; 100) in a power brake system (1.1, 1.2, 1.3, 1.4) of a vehicle (2), the power brake system including a pressure medium source (14), a pressure-medium-operated primary brake system (30), which can be used as a service brake and steering brake system, the primary brake system (30) including at least one foot brake valve (36a, 36b) and at least two wheel brake cylinders (40a, 40b) arranged on opposite sides on a drive axle (8) and configured to be actuated independently of one another, a pressure-medium-operated secondary brake system (50; 50'; 68; 100) operable independently of the primary brake system (30) and configured to be used at least as an auxiliary brake system, the secondary brake system (50; 50'; 68; 100) including a brake control valve (56; 70; 102) and at least one brake cylinder (62a, 62b; 62a', 62b'; 82a, 82b), acting on wheel brakes of a vehicle axle (4, 8), wherein the secondary brake system (50; 50'; 68; 100) is electronically controllable and includes the brake control valve (56; 70; 102) configured as a solenoid valve for setting a braking force of by feeding or removing pressure medium to or from the at least one brake cylinder (62a, 62b; 62a', 62b'; 82a, 82b); a pressure sensor (64; 90) connected to a working line (60; 60'; 74, 80) leading to the at least one brake cylinder (62a, 62b; 62a', 62b'; 82a, 82b); and an electronic brake control unit (46) for evaluating a pressure signal of the pressure sensor (64; 90) and for controlling the brake control valve (56; 70; 102) in accordance with a braking value signal ($S_{BW}$);

the method comprising the step of:

controlling the brake control valve (56; 70; 102) based on characteristic curves (A, B, C; D, E, F) which are valid for different operating modes of the secondary brake system (50; 50', 68; 100) and stored in a non-volatile data memory (78) assigned to the brake control unit (46);

the method further comprising at least one of the steps of:

performing, wherein the secondary brake system (50; 50') includes actively acting brake cylinders (62a, 62b; 62a', 62b'), an emergency braking function by activating the secondary brake system to assist or to replace an operation of the service brake system (30), by increasing a working pressure ($p_B$) linearly according to a first characteristic curve (A), starting from a minimum brake pressure ($p_{B\_min}$) close to 0 Pa at a value of the braking value signal of $S_{BW}$=0%, and, as the value of the braking value signal increases, increasing the working pressure ($p_B$) up to a maximum brake pressure ($p_{B\_max}$) at a value of the braking value signal of $S_{BW}$=100%;

performing, wherein the secondary brake system (50; 50') includes actively acting brake cylinders (62a, 62b; 62a', 62b'), an auxiliary braking function, by activating the secondary brake system to replace a braking effect of the service brake system on the vehicle, by increasing a working pressure ($p_B$) according to a second characteristic curve (B), starting from a minimum brake pressure ($p_{B\_min}$) at a value of the braking value signal of $S_{BW}$=0%, as the value of the braking value signal increases, increasing the working pressure ($p_B$) up to a maximum brake pressure set for a normal operation ($p_{B\_max-N}$), which is below a maximum brake pressure ($p_{B\_max}$), at a braking value signal of $S_{BW}$=100%;

performing, wherein the secondary brake system (50; 50') includes actively acting brake cylinders (62a, 62b; 62a', 62b'), an additional braking function, by activating the secondary brake system to assist the service brake system (30) in braking by activating the secondary brake system when braking value signals require a high braking pressure, by increasing a working pressure ($p_B$) progressively according to a third characteristic curve (C), starting from a minimum brake pressure ($p_{B\_min}$) at a value of the braking value signal of $S_{BW}$=0%, as the value of the braking value signal increases, from a defined starting value of the braking value signal ($S_{BW\_Start}$), increasing the working pressure ($p_B$) up to a working pressure ($p_B$), at a braking value signal $S_{BW}$=100%, which is between the minimum brake pressure ($p_{B\_min}$) and a maximum brake pressure set for normal operation ($p_{B\_max-N}$);

performing, wherein the secondary brake system (68; 100) includes passively acting brake cylinders (82a, 82b), an emergency braking function, by activating the secondary brake system to assist or to replace the service brake system (30) in braking by reducing a working pressure ($p_{FSB}$) largely linearly according to a seventh characteristic curve (D), starting from a maximum working pressure ($p_{FSB\_max}$) at a value of the braking value signal of $S_{BW}$=0%, and as the values of the braking value signal increase, increasing the working pressure ($p_B$) to a minimum working pressure ($p_{FSB\_min}$) close to 0 Pa at a value of the braking value signal of $S_{BW}$=100%;

performing, wherein the secondary brake system (68; 100) includes passively acting brake cylinders (82a, 82b), an auxiliary braking function, by activating the secondary brake system to replace the service brake system (30) with respect to a braking effect on the vehicle by reducing a working pressure ($p_{FSB}$) according to an eighth characteristic curve (E), starting from a maximum working pressure ($p_{FSB\_max}$) at a value of the braking value signal of $S_{BW}$=0%, and as the values of the braking value signal increase, reducing the working pressure ($p_{FSB}$) to a minimum working pressure in normal operation ($p_{FSB\_min-N}$) at a value of the braking value signal of $S_{BW}$=100% which is above the minimum working pressure ($p_{FSB\_min}$); or performing, wherein the secondary brake system (68; 100) includes passively acting brake cylinders (82a, 82b), an additional braking function, by activating the secondary brake system to assist the service brake system (30) in braking in situation with higher values of the braking value signal by reducing a working pressure ($p_B$) according to a ninth characteristic curve (F), starting from the maximum working pressure ($p_{FSB\_max}$) at a value of the braking value signal of $S_{BW}$=0%, from a defined starting value of the braking value signal ($S_{BW\_Start}$), and as the Values of the Braking value signal increase, reducing the working pressure to a working pressure ($p_{FSB}$), at a braking value signal $S_{BW}$=100%, which is between the maximum working pressure ($p_{FSB\_max}$) and the minimum working pressure in normal operation ($p_{FSB\_min-N}$).

14. A method for controlling a pressure-medium-operated secondary brake system (50; 50', 68; 100) in a power brake system (1.1, 1.2, 1.3, 1.4) of a vehicle (2), the power brake system including a pressure medium source (14), a pressure-medium-operated primary brake system (30), which can be used as a service brake and steering brake system, the primary brake system (30) including at least one foot brake valve (36a, 36b) and at least two wheel brake cylinders (40a, 40b) arranged on opposite sides on a drive axle (8) and configured to be actuated independently of one another, a pressure-medium-operated secondary brake system (50; 50'; 68; 100) operable independently of the primary brake system (30) and configured to be used at least as an auxiliary brake system, the secondary brake system (50; 50'; 68; 100) including a brake control valve (56; 70; 102) and at least one brake cylinder (62a, 62b; 62a', 62b'; 82a, 82b), acting on wheel brakes of a vehicle axle (4, 8), wherein the secondary brake system (50; 50'; 68; 100) is electronically controllable and includes the brake control valve (56; 70; 102) configured as a solenoid valve for setting a braking force of by feeding or removing pressure medium to or from the at least one brake cylinder (62a, 62b; 62a', 62b'; 82a, 82b); a pressure sensor (64; 90) connected to a working line (60; 60'; 74, 80) leading to the at least one brake cylinder (62a, 62b; 62a', 62b'; 82a, 82b); and an electronic brake control unit (46) for evaluating a pressure signal of the pressure sensor (64; 90) and for controlling the brake control valve (56; 70; 102) in accordance with a braking value signal ($S_{BW}$);

the method comprising the step of:

controlling the brake control valve (56; 70; 102) based on characteristic curves (A, B, C; D, E, F) which are valid for different operating modes of the secondary brake system (50; 50', 68; 100) and stored in a non-volatile data memory (78) assigned to the brake control unit (46);

wherein the characteristic curves include a first characteristic curve, a second characteristic curve, and a third characteristic curve, wherein the second characteristic curve (B) for an auxiliary braking function and the third characteristic curve (C) for an additional braking function are generated from the first characteristic curve (A) for an emergency braking function of the secondary brake system (50; 50') via a transfer function with variable reduction of a working pressure ($p_B$) over the braking value signal ($S_{BW}$), wherein the variable reduction of the working pressure ($p_B$) is greater at low values of the braking value signal than at high values of the braking value signal.

15. The method as claimed in claim 14, wherein the characteristic curves further include a fourth characteristic curve, a fifth characteristic curve, and a sixth characteristic curve, wherein the fourth, fifth, and sixth characteristic curves (A', B', C') are configured for a light vehicle or a vehicle with a low load, in comparison with the first, second, and third characteristic curves (A, B, C), which are configured for a heavy vehicle or a vehicle with a high load, and wherein the fourth, fifth, and sixth characteristic curves (A', B', C') have a profile of the working pressure ($p_B$) which is, in comparison with the first, second, and third characteristic curves (A, B, C), reduced toward the minimum working pressure ($p_{B\_min}$), based on increasing values of the braking value signal ($S_{BW}$).

16. The method as claimed in claim 15, wherein the fourth to sixth characteristic curves (A', B', C') for a light vehicle or a vehicle with low load are generated from the first, second and third characteristic curves (A, B, C) for a heavy vehicle or a vehicle with a high load, by reducing a working pressure ($p_B$) proportional to the weight of the light vehicle or the vehicle with low load in comparison with the weight of the heavy vehicle or a vehicle with a high load, based on increasing values of the braking value signal ($S_{BW}$).

17. The method as claimed in claim 15, wherein the characteristic curves further include a seventh characteristic curve, an eighth characteristic curve, and a ninth characteristic curve, wherein the eighth characteristic curve (E) for an auxiliary braking function and the ninth characteristic curve (F) for N additional braking function are generated from the seventh characteristic curve (D) for the emergency braking function of the secondary brake system (68; 100) via a transfer function with variable increase of the working pressure ($p_{FSB}$) over the braking value signal ($S_{BW}$) toward the maximum working pressure ($p_{FSB\_max}$), wherein the increase of the working pressure ($p_{FSB}$) is less at low values of the braking value signal than at high values of the braking value signal.

18. The method as claimed in claim 17, wherein the characteristic curves further include a tenth characteristic curve, an eleventh characteristic curve, and a twelfth characteristic curve, wherein the tenth, eleventh and twelfth characteristic curves (D', E', F') for a light vehicle or a vehicle with a low load, in comparison with the corresponding seventh, eighth and ninth characteristic curves (D, E, F) for a heavy vehicle or a vehicle with a high load, have a profile of the working pressure ($p_{FSB}$) which is increased toward the maximum working pressure ($p_{FSB\_max}$), based on increasing values of the braking value signal ($S_{BW}$).

19. The method as claimed in claim 18, wherein the tenth, eleventh and twelfth characteristic curves (D', E', F') for a light vehicle or a vehicle with low load are generated from the seventh, eighth and ninth characteristic curves (D, E, F) for a heavy vehicle or a vehicle with a high load via a variable increase in the working pressure ($p_{FSB}$), which is proportional to the weight of the vehicle, toward the maximum pressure ($p_{FSB\_max}$), based on increasing values of the braking value signal ($S_{BW}$), wherein the increase of the working pressure ($p_{FSB}$) is less at low values of the braking value signal than at high values of the braking value signal.

* * * * *